(12) United States Patent
Osterweil et al.

(10) Patent No.: US 7,591,426 B2
(45) Date of Patent: Sep. 22, 2009

(54) METHOD AND SYSTEM FOR DATA WRITING/READING ONTO/FROM AND EMULATING A MAGNETIC STRIPE

(76) Inventors: Josef Osterweil, 5411 Amberwood La., Rockville, MD (US) 20853; Moshe Shadmon, 4020 Wilkie Way, Palo Alto, CA (US) 94306

(*) Notice: Subject to any disclaimer, the term of this patent is extended or adjusted under 35 U.S.C. 154(b) by 799 days.

(21) Appl. No.: 10/553,637

(22) PCT Filed: Apr. 19, 2004

(86) PCT No.: PCT/US2004/010951
§ 371 (c)(1),
(2), (4) Date: Oct. 19, 2005

(87) PCT Pub. No.: WO2004/095169
PCT Pub. Date: Nov. 4, 2004

(65) Prior Publication Data
US 2006/0283958 A1   Dec. 21, 2006

Related U.S. Application Data

(60) Provisional application No. 60/464,123, filed on Apr. 21, 2003.

(51) Int. Cl.
*G06K 7/08* (2006.01)

(52) U.S. Cl. ..................... 235/449; 235/451
(58) Field of Classification Search ........... 235/449, 235/451, 453, 493
See application file for complete search history.

(56) References Cited

U.S. PATENT DOCUMENTS

| | | | | |
|---|---|---|---|---|
| 4,634,848 A | * | 1/1987 | Shinohara et al. | 235/449 |
| 5,650,606 A | * | 7/1997 | Baus, Jr. | 235/449 |
| 6,206,293 B1 | * | 3/2001 | Gutman et al. | 235/493 |

* cited by examiner

*Primary Examiner*—Daniel St.Cyr

(57) ABSTRACT

A method of writing data on magnetic stripe of a smart card by imposing a magnetic field of a given polarity on each selected segment of the magnetic stripe, such that data on the magnetic stripe can be read by a magnetic card reader and interpreted as digital bits. The method includes providing a multi-dimensional conductor array placed proximate to the magnetic stripe, the number of conductors in the array is considerably smaller than the number of segments, and each segment is associated with two or more conductors. The method further includes providing current drivers for sending currents in a controlled direction through the conductor array. The system further includes sending currents, using said current drivers, through conductors of the array, such that for each one of the selected segment composite currents flowing through its associated two conductors overcome the coersivity of the segment on the magnetic stripe.

18 Claims, 14 Drawing Sheets

METHOD AND SYSTEM FOR DATA WRITING/READING ONTO/FROM AND EMULATING A MAGNETIC STRIPE

RELATED DATA

The present application expressly incorporates by reference herein the entire disclosure of U.S. Provisional Application No. 60/464,123, entitled "Method and Apparatus for a data Writing onto and Emulating Magnetic Stripe", which was filed on Apr. 21, 2003.

FIELD OF THE INVENTION

The present invention is generally in the field of improved smart cards.

BACKGROUND AND RELATED INFORMATION

The use of plastic cards bearing a magnetic stripe for effecting sales, banking, and other diverse transactions is very popular, in part because of the ease with which such cards may be legitimately used to effect these transactions, and because of the ubiquitous infrastructure that makes their use possible.

A magnetic stripe on a card enables the card to be swiped repeatedly in a card reader and convey the digital information stored on the stripe to that reader. The information on a magnetic stripe is written onto the stripe by a magnetic write-head, similar to the way digital information is written onto a magnetic tape. Writing onto the magnetic stripe requires that the write-head moves relative to the stripe while generating a variable bipolar magnetic field that represents the data to be stored, and magnetizes the particles along the stripe accordingly. The magnetic stripe material typically in the form of a slurry is deposited on a card, ticket, or other item in a similar way as paint is deposited on a surface. The magnetic particles retain the memory of their last direction of the magnetic polarity until a magnetic field strong enough to overcome the particle's coercive force changes the polarity to a new direction.

The American National Standards Institute (ANSI) & ISO/IEC has defined standards relating to magnetic stripe cards.

A typical magnetic stripe is segmented into four channels, three of which are defined for a specific format by ANSI. These tracks are defined only by their location on the magnetic stripe. Each is dedicated to a different purpose:

Track one contains the cardholder's name as well as account and other discretionary data Track two contains the cardholder's account number, encrypted Personal Identification Numbers (PIN), finger print characteristics, and other discretionary data. This track is the most commonly used and is read by Automatic Teller Machines (ATM) and credit card checkers Track 3 is unique and rarely used.

Most ATM cards follow these standards, but there are many other types of cards (key cards, security cards, copy machine cards, etc.) that do not follow these established standards.

Smart cards refer to cards that typically include embedded input/output interface, memory, and a microprocessor. Smart cards look like standard plastic cards, but are equipped with embedded Integrated Circuit(s). Smart cards can store information, execute local processing on data, and interface with external devices. These cards take the form of either "contact" cards that require an electrical connection to an external card interface (Card Acceptance Device (CAD)) or "contactless" cards that communicate by electromagnetic signals to the external card interface (CAD). The contact card typically has eight metallic interface pads on its surface, each designed to international standards for VCC (power supply voltage), RST (used to reset the microprocessor of the smart card), CLK (clock signal), GND (ground), VPP (programming or write voltage), and I/O (serial input/output line). Two pads are reserved for future use (RFU). Only the I/O and GND contacts are mandatory on a card to meet international standards; the other contacts are optional.

When a smart card is inserted into a Card Acceptance Device or CAD (such as a point-of-sale terminal), the metallic pads come into contact with the CAD's corresponding metallic pins, thereby allowing the card and CAD to communicate. Smart cards are reset when they are inserted into a CAD. This action causes the smart card to respond by sending an "Answer-to-Reset" (ATR) message, which informs the CAD of what rules govern communication with the card and the processing of a transaction.

Note that in the context of the invention, smart cards are not bound to the structure and manner of operation discussed above. Thus, for example, contact smart cards are not bound by the particular standard described above, and this applies also to contactless cards. By way of another example, smart cards are not bound by any specific substrate, such as plastic cards.

Notwithstanding the advantages of smart cards over magnetic cards, the adoption of smart cards has been relatively slow in the US and other leading markets. One of the main reasons for their slow adoption is the present lack of support infrastructure (e.g. dedicated readers), necessitating retrofitting of equipment such as vending machines, ATMs, and telephones to incorporate dedicated readers that are adapted to read smart cards and possibly also write data thereon.

The standard "non-smart" magnetic stripe cards, on the other hand, enjoy a ubiquitous infrastructure in many commercial, access control, and other applications and notwithstanding their inferiority compared to smart cards, consumers use predominantly magnetic cards.

The invention according to the PCT publication WO 01/88659 (hereinafter the PCT publication) combines the inherent advantages of smart cards with the widely circulated magnetic card readers. PCT WO 01/88659 discloses an electronic card that can function as an anonymous credit card or banking card for use on or off the Internet, and which utilizes a magnetic storage medium affixed to the card that can be read by a standard magnetic stripe reader. An encoder generates a data packet that can be stored in a designated portion of the magnetic storage medium, which can be a magnetic stripe. The data packet can contain a personal coupon and an alias. A computer or microprocessor generates the personal coupon after a Personal Identification Number is input into the card. The data packet can also be used to convey other information, such as a low battery condition. Several different methods of customizing use of the electronic card provide a vast array of options for handling multiple users, bills, and accounts; and for characterizing individual transactions of the card.

The device disclosed in the '659 publication offers backward compatibility in the sense that information stored in or generated by the smart card and stored in track #2 of the magnetic stripe is accessible by conventional magnetic card readers. The backward compatibility allows the users and industry to benefit from the widely circulated and reliable infrastructure of the magnetic cards readers, and obviates the need for extensive and expensive retrofit, as would be required with conventional smart cards using dedicated smart card readers.

Some of the principles of operation which relate to the PCT application, and which serve as a background for understanding the invention, will be explained with reference to FIGS. 1 to 3. FIG. 1 shows current flowing through a conductor 4 (illustrated in cross-section front view in FIG. 1) that generates magnetic field 6 of strength H (around the conductor 4). The strength of the magnetic field H complies with the following algorithmic expression:

$$H = \frac{I}{R}$$

Where: I is the current in the conductor and R is the radius (distance) from the center of the conductor 4 to the location of interest where magnetic field 6 H is measured. The direction of the magnetic field 6 H is clockwise as indicated by the arrows on the magnetic field lines 6, and corresponds to a current direction in the conductor 4 that is perpendicular to the page and flows in a direction from the viewer into the page.

As is further shown in FIG. 1, a thin magnetic stripe layer segment 2 is located in close proximity to the conductor 4. The flow through the conductor imposes a magnetic field with polarity of North Pole (N) and South Pole (S), as indicated in FIG. 1. The SN poles illustrated in. FIG. 1 constitute a magnetic domain; each track in the magnetic stripe layer includes a plurality of magnetic domains in a line. When the current direction is reversed in a direction from the page to the viewer, the direction of the magnetic field is reversed to counterclockwise, and so are the S and N polarities on the magnetic stripe (not shown). The magnetic field strength 6 must be intense enough to overcome the coercivity of the magnetic stripe 2 material. Since the magnetic field is proportional to the current in the conductor 4, it is necessary to reach a balance between the magnitude of the current pulse and the coercivity of the magnetic material. Once the magnetic polarity on the magnetic stripe 2 has been set by the current, the current flow can be stopped and the imprint on the magnetic stripe will remain in that setting until reversed by a reverse current in the conductor 4 or by an external magnetic field that is strong enough to overcome the coercivity of the magnetic stripe 2. Thus, current impulses of the right magnitude and direction are sufficient to imprint data on the magnetic stripe material.

Note that it is desirable to minimize the magnitude of the current pulses so that currents and their current drivers become manageable. However, the lower the coercivity of the magnetic stripe material, the more susceptible is the magnetic stripe to being inadvertently modified by external magnetic fields.

FIG. 2 illustrates a typical card 10 with a magnetic stripe and four channel (tracks) 20, 30, 40, and 50. The resolution of such a magnetic stripe varies and some standards suggest 75 and 210 bits per inch of data density.

FIG. 3a shows a schematic view of a segment of one channel of the associated magnetic stripe 70 of a smart card. Items 80a, 80b, and 80c, drawn in dotted lines, represent the conductors in a layer below the magnetic stripe 70. Note that the distance between the conductors determines the maximal bit density possible. For example, for a resolution that will accommodate 210 bits per inch, at least 210 conductors per inch must be constructed.

FIG. 3B illustrates a cross-section view along AA of the segment depicted in FIG. 3A, in which 80a, 80b, and 80c are the conductors with insulating material 75 between them, while on top of them is located the magnetic stripe 70.

FIG. 3C illustrates a cross-section view along BB of the segment depicted in FIG. 3A in which the leads 82a and 82b are made available for connections between the conductor 80c and a current delivery and switching drivers.

The principles described with reference to FIGS. 1 to 3 above are suitable for integration with a smart card. The current drivers deliver the currents necessary to write and rewrite the data content of the smart card's magnetic stripe, in accordance with the conceptual approach described with reference to FIG. 1. The smart card's direct writing is initiated by external command inputs to the smart card or by, for example, stroke(s) on the card's keyboard. After having written the data on the magnetic stripe, when the smart card is swiped in a standard magnetic stripe reader, the last data written will be available to the reader.

To summarize, FIG. 3A, FIG. 3B and FIG. 3C, track # 2 of magnetic stripe 70 is part of a standard credit card, and the conductors 80a, 80b, and 80c as well as the insulator 75 are part of the smart card (as described in the PCT publication).

There are also provided appropriate electronics and current drivers. The object bearing the magnetic stripe 70, for example, a credit card is placed in close proximity to the conductors 80a, 80b, and 80c as seen in FIG. 3b, all forming part of the card. Currents through the conductors 80a, 80b, and 80c induce the data information onto the stripe.

A smart card of the kind described generally in FIGS. 1 to 3 is disclosed in the '659 PCT publication but it purports only to offer an improved smart card which facilitates digital data transformation into a format that is compatible with the standard magnetic stripe reader. One of the significant disadvantages of the smart card disclosed in the '659 publication is the use of a many conductors and a cumbersome electronic system including current drivers in order to facilitate data writing onto the magnetic stripe. Such a cumbersome electronic system (as will be explained with greater detail below) poses high manufacturing costs and consumes battery power, thereby hindering the wide circulation into the marketplace of a smart card of the kind disclosed in the '659 publication.

For a better understanding of the cumbersome structure of the electronics system and drivers in accordance with the PCT publication, there follows a description of a "write bit" operation (of bit value '0' or '1'), including flip bit value (from '1' to '0' or vise versa) and "read bit" operation.

Thus, and as depicted in FIG. 7D of the '659 publication (attached herewith and marked as 3D), each bit is represented by two magnetic domains (each being imposed to either SN or NS magnetic orientation). As may be recalled, the description with reference to FIG. 1, above, exemplified the correspondence between current flow direction in the conductor and corresponding magnetic orientation (SN or NS) per domain.

As depicted in FIG. 7D, each domain is associated with two conductors, which, depending upon the direction of the currents flowing through the respective conductors (e.g. 34 and 35 of FIG. 7D), will impose the polarity of the magnetic domain to NS or SN (using basically the concept described in FIG. 1, above).

Generally speaking, when the current flows in a prescribed direction through the two conductors associated with a given magnetic domain (say 34 and 35 in FIG. 7D), it imposes a polarity NS. Similarly, the polarity of the mating magnetic domain is also imposed to NS (using current flowing in the same prescribed direction through its respective two conductors). Given two successive NS domains written in the manner specified current direction, (i.e. the polarity of each one of the mating magnetic domains is imposed to NS), when a conventional magnetic reader reads the succession of NS and NS (i.e. the neighboring magnetic domain have the same magnetic orientation), there is no flux reversal (i.e. the magnetic reader regards the two consecutive domains as a single NS), and thus indicates a bit value of '0'. Similarly, when the magnetic card reader reads a succession of SN and SN (where, during a preceding writing phase, each SN was imposed on a magnetic domain by current flowing in prescribed direction through the respective two conductors associated with the magnetic domain), it also indicates a bit value of '0', since here also there is no flux reversal. In contrast, when the magnetic orientation of a first magnetic domain is SN and the magnetic orientation of the neighboring domain is opposite (NS), the magnetic reader senses flux reversal between the neighboring domains, and this is interpreted as '1'. By the same principle two opposite magnetic orientations NS followed by SN, will likewise give rise to flux reversal (sensed by the reader) and will be interpreted as '1'.

The encoding of '0' and '1' in the manner specified is illustrated in FIG. 7B of the PCT publication (attached herewith and marked as 3E) where, as shown, consecutive domains with identical magnetic orientation (NS, NS or SN, SN) are interpreted as '0' (see, for example, the first raw of the specified FIG. 7B), whereas consecutive magnetic domains with opposite magnetic orientation (NS, SN or SN, NS) are interpreted as '1'. Note that the frequency of '1' (e.g. the second raw of FIG. 7B) is twice the frequency of the '0' (e.g. the first raw of FIG. 7B), in accordance with the Aiken Biphase code discussed in the PCT publication.

In accordance with the PCT publication, two conductors are used per domain, giving rise to four conductors per each bit. The use of two conductors per domain and associated electronics, as described in the '659 publication, facilitates relatively rapid writing and changing of current flow direction (through the conductor(s)) whenever flipping polarity is required (i.e. when a bit value needs to be inversed from '1' to '0' or vise versa). This writing and flipping polarity is achieved at the cost of using a cumbersome system that includes 4 conductors and associated electronics per bit. The associated electronics include current drivers that employ one transistor per conductor. Considering that a relatively high current is required to overcome the magnetic coercivity of the magnetic domain (whenever flipping the polarity is required), the so utilized transistor should sustain currents of relatively high magnitudes, requiring thus power transistors which consequently require larger real-estate on the board or silicon chip than low current transistors do.

As may be recalled, relatively high currents are utilized since the higher the current, the stronger the generated magnetic field, thereby reducing the prospects of undesired flipping of the magnetic domain's polarity due to influence of external magnetic fields.

Thus, for example, for a series of 500 bits that reside on the magnetic stripe, 2000 conductors and 2000 power transistors (used in the current drivers) are utilized. The description with reference to FIG. 8 of the 659 publication illustrates the complexity of a system of the kind specified.

Realizing such a cumbersome system in a chip that is incorporated in a card having dimensions of a conventional credit card is relatively expensive, because the conductors and associated electronic circuitry would require relatively large real-estate chip space, rendering the manufacture of such chips expensive. Note also that the more complicated the chip, the lesser the yield rate (i.e. the percentage of the fault free manufactured chips), giving rise to increased manufacturing costs, chip price, and the resulting smart card.

Note also that circuitry of the kind specified consumes battery power (due to the use of many current drivers, thus significantly reducing the lifespan of the card's battery, posing undue burden of the user who is compelled to frequently change or re-charge used batteries.

Note also that the switching mechanism of pulsed current in selectable directions into each individual conductor embedded in the magnetic stripe has been used in prior art in conjunction with, for example, magnetic core memory, and will therefore not be further expounded upon herein.

It is thus appreciated that the solution according to the '659 publication suffers from various shortcomings; accordingly there is a need in the art to provide for a novel backward-compatible solution of a smart card that can be used, inter alia, with conventional magnetic card readers. Such an improved smart card can be used, among other uses, to consolidate a plurality of credit cards into a single smart card.

There is a further need in the art for providing an improved smart card capable of static emulation of magnetic stripe, for use with conventional magnetic card readers.

There is still further need in the art for providing an improved smart card capable of dynamic emulation of magnetic stripe, for use with conventional magnetic card readers. There is still further need in the art to use such improved smart card in dual function, allowing also writing thereto using conventional magnetic card writer.

There is still further need in the art for providing a new type of magnetic card writer with no moving parts, configured to write data on magnetic stripes of conventional credit cards, for example.

SUMMARY OF THE INVENTION

In accordance with a first aspect of the invention, there is provided a smart card device that includes processing and other means coupled to storage medium, and which is associated with a magnetic stripe. The processing and other means enable direct writing of information onto the magnetic stripe. The so written data is originally stored in the storage of the smart card, and/or is generated by the processor of the smart card, and/or based on information that has been received from external source (e.g. by the user through input means such as a keypad that is associated with the smart card).

In accordance with an embodiment of the first aspect of the invention, there is provided an improved smart card accommodating a stationary bi-dimensional or multi-dimensional array, such as bi-dimensional matrix, without moving parts that selects writing (current flow) to each conductor by addressing at least two matrix coordinates utilized by the smart card. This matrix simplifies the complexity of the electronic drivers that inject current into each conductor segment. As will be explained in greater detail below, such reduced complexity leads to certain advantages, including reduced manufacturing and retail costs, as well as extending the product's battery lifespan.

There is provided, in accordance with a first aspect of the invention, a method of writing data on magnetic stripe of a smart card by imposing magnetic field of a given polarity on each selected segment of the magnetic stripe, such that data on the magnetic stripe can be read by a magnetic card reader, and interpreted as digital bits, comprising:

(i) providing a multi-dimensional conductor array placed proximate to the magnetic stripe, where the number of conductors in the array is considerably smaller than the number of segments, and where each segment is associated with at least two conductors;

(ii) providing current drivers for sending currents in controlled direction through the conductor array; and (iii) sending currents, using said current drivers, through conductors of the array, such that for each one of the selected segment composite currents flowing through it's associated segment in at least two conductors overcome the coersivity of the segment of the magnetic stripe.

There is thus provided, in accordance with a second aspect of the invention, a method for statically emulating a magnetic stripe, such that data can be read by a magnetic card reader and interpreted as digital bits, comprising:

a) providing in a smart card a conductor array proximate to the card's surface;

b) providing current drivers for sending currents in controlled direction through the conductor array; and c) sending currents, using said current drivers, through conductors of the array, for generating magnetic field of sufficient magnitude so as to be read by the magnetic card reader and interpreted as digital bits, while the card is being swiped for reading.

In accordance with a third aspect of the invention there is provided a dynamic emulation of a magnetic stripe that facilitates motionless card reading. In accordance with this aspect, the smart card is positioned so that the magnetic field generated by the conductor is proximate to the magnetic read-head of a card reader. In accordance with this aspect, there is no need to swipe the card such that the magnetic stripe (or the magnetic field in case of static emulated magnetic stripe) traverses the read head of the reader. Accordingly, errors that stem from undue swiping of the card (and which occasionally require that the user should re-swipe the card) are avoided. As will be explained in greater detail below, in dynamic emulation the number of conductors is significantly reduced and the associated electronics is considerably simplified. The net effect is that manufacturing costs are significantly reduced and the smart card's battery lifespan is considerably extended.

There is thus provided in accordance with a third aspect of the invention a method for dynamically emulating a magnetic stripe, such that data can be read by a magnetic card reader and interpreted as digital bits, comprising:

(i) providing at least one conductor proximate the card surface;

(ii) providing at least one current driver for sending current through the at least one conductor; and (iii) sending variable current, using at least one said current driver, through the at least one conductor, for generating magnetic field of sufficient magnitude so as to be read by the magnetic card reader and interpreted as digital bits.

There is still further provided, in accordance another aspect of the invention, the use of a conventional magnetic stripe writer for conveying data to the smart card using the magnetic coupling between the write head and (possibly) an elongated conductor(s).

There is thus provided in accordance with this aspect of the invention a method for writing data onto a smart card, using a magnetic card writer, comprising:

a) providing at least one conductor proximate the card surface; and b) providing a magnetic coupling between the write head of a magnetic stripe writer and at least one conductor, for entering data to the smart card.

Still further, there is provided in accordance with another aspect of the invention a new type of magnetic writer, with no moving parts. The magnetic writer includes a conductor array that is external to the card and is used as a magnetic stripe writer for writing onto standard magnetic stripe cards.

There is thus provided in accordance with this aspect of the invention a method for writing data on a magnetic stripe of a magnetic card, comprising:

(i) providing a conductor array proximate to the magnetic stripe;

(ii) providing current drivers for sending currents in controlled direction through the conductor array; and (iii) sending currents, using said current drivers, through conductors of the array, for generating magnetic field of sufficient magnitude so as to overcome the coersivity of the magnetic stripe.

The invention further provides for a system for writing data on a magnetic stripe of a card, comprising a writing device capable of writing data onto the magnetic stripe being placed in proximity thereto, such that the writing device is characterized as having no moving parts.

The invention further provides for a system for writing data on a magnetic stripe of a card, comprising a writing device capable of writing data onto the magnetic stripe dynamically, in conjunction with a device synchronizing it to the swipe velocity of the card.

Still further, the invention provides for a smart card storing information of multiple cards such that the said card includes a processor and an associated device capable of conveying data indicative of a selected card from among said plurality of cards to a magnetic stripe of the smart card, so as to be read by a magnetic card reader.

Still further, the invention provides for a smart card storing information of multiple cards such that the said card includes a processor and an associated device capable of emulating data indicative of a selected card from among said plurality of cards such that said emulated data is capable of being read by a magnetic card reader.

Still further, the invention provides for a system of storing data indicative of multiple cards in a storage area of a programmable module; such that the said system is capable of transferring data to a magnetic stripe of a card.

BRIEF DESCRIPTION OF THE DRAWINGS

For a better understanding, the invention will now be described, by way of example only, with reference to the accompanying drawings, in which.

DETAILED DISCLOSURE OF THE INVENTION

Figure 17:
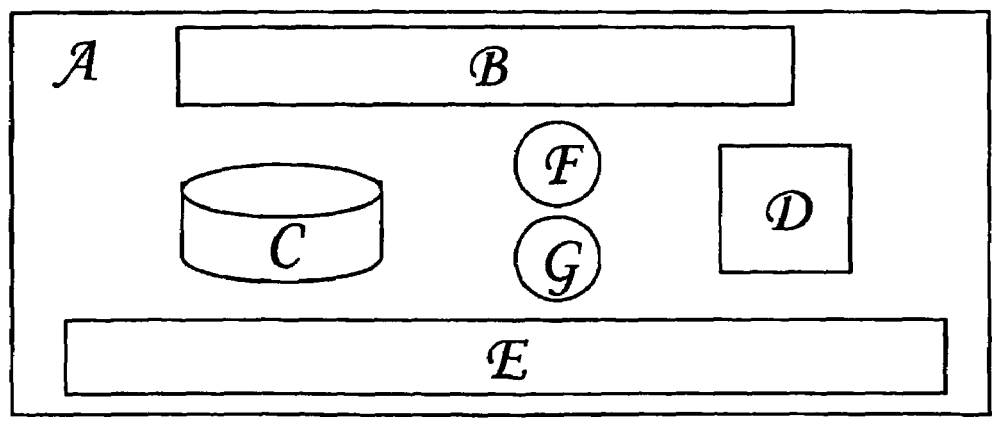
FIG. 17 illustrates schematically modules of a smart card, in accordance with an embodiment of the invention.

FIG. 17 illustrates schematically modules of a smart card in accordance with an embodiment of the invention.

Figure 4A:
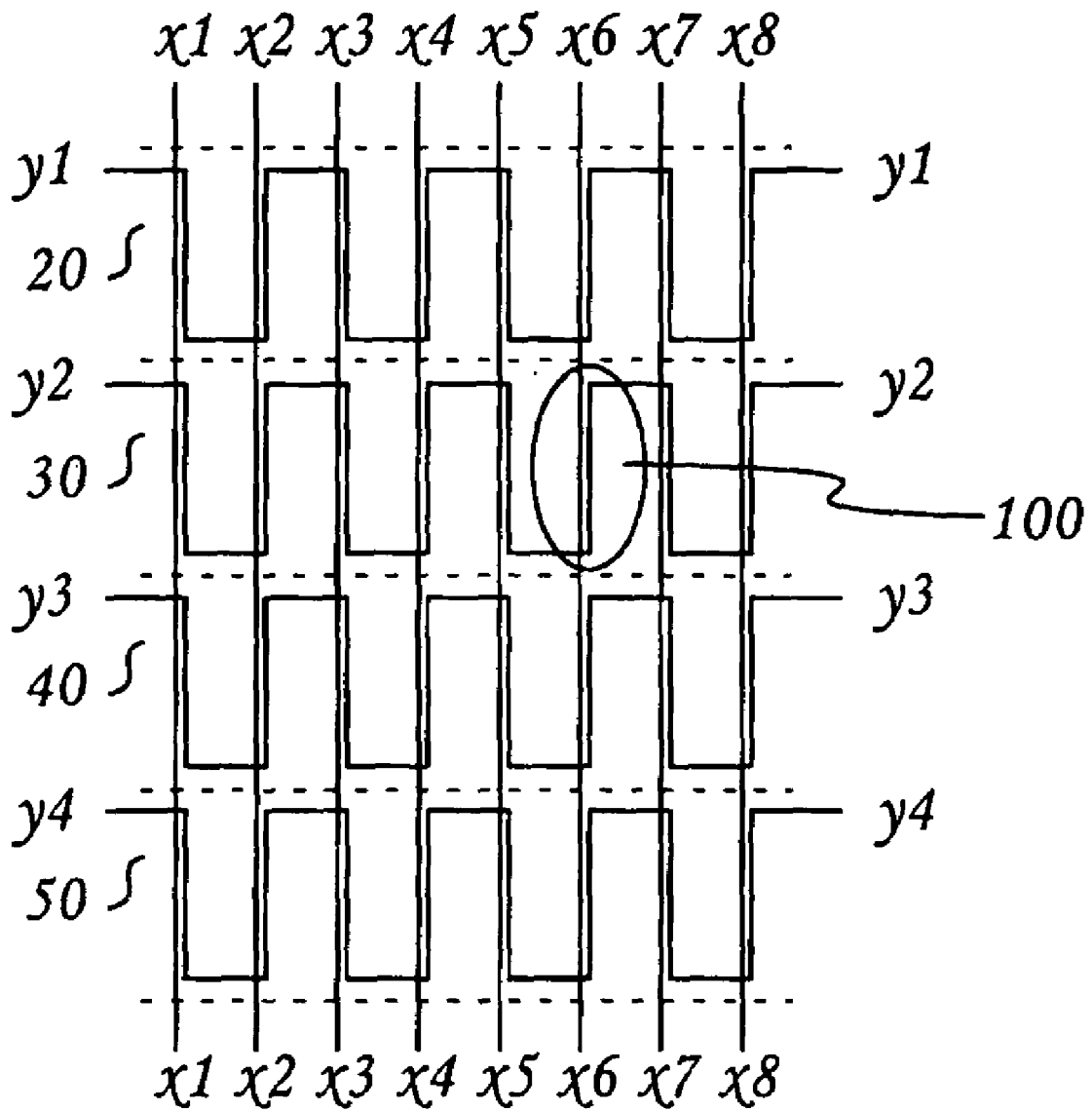
FIG. 4A illustrates a matrix conductor array in accordance with an embodiment of an aspect of the invention.

In accordance with a first aspect of the invention, there is provided a bi-dimensional or multi-dimensional conductor array that is proximate to the magnetic stripe that copes with the shortcomings of the hitherto known solutions. FIG. 4A illustrates a non-limiting embodiment of this aspect of the invention utilizing a matrix conductor array. It should be noted that the invention is not bound by any specific magnetic material that forms the magnetic stripe.

Thus, as shown, two substantially proximate conductors are associated to each domain, to allow a selection of each domain by the sum of currents in the two conductors. (As may be recalled, two domains constitute a single bit). Therefore, the sum of two currents flowing in the same direction is designed to overcome the coercivity of the magnetic stripe for each domain, whereas each current alone or two opposing currents will not. In FIG. 4A, current through lines y2-y2 and x6-x6 that add together to become a higher current at domain 100 is an example of such matrix domain selection. This approach is akin to the selection process of a single core in a magnetic core memory, allows the selection to be accomplished in the form of a matrix, and consequently uses fewer current drivers. Note that in the context of the invention, domain is only one example of a segment of a magnetic stripe that is subjected to imposition of magnetic field, for writing data thereon. The invention is not bound by this example.

Figure 4B:
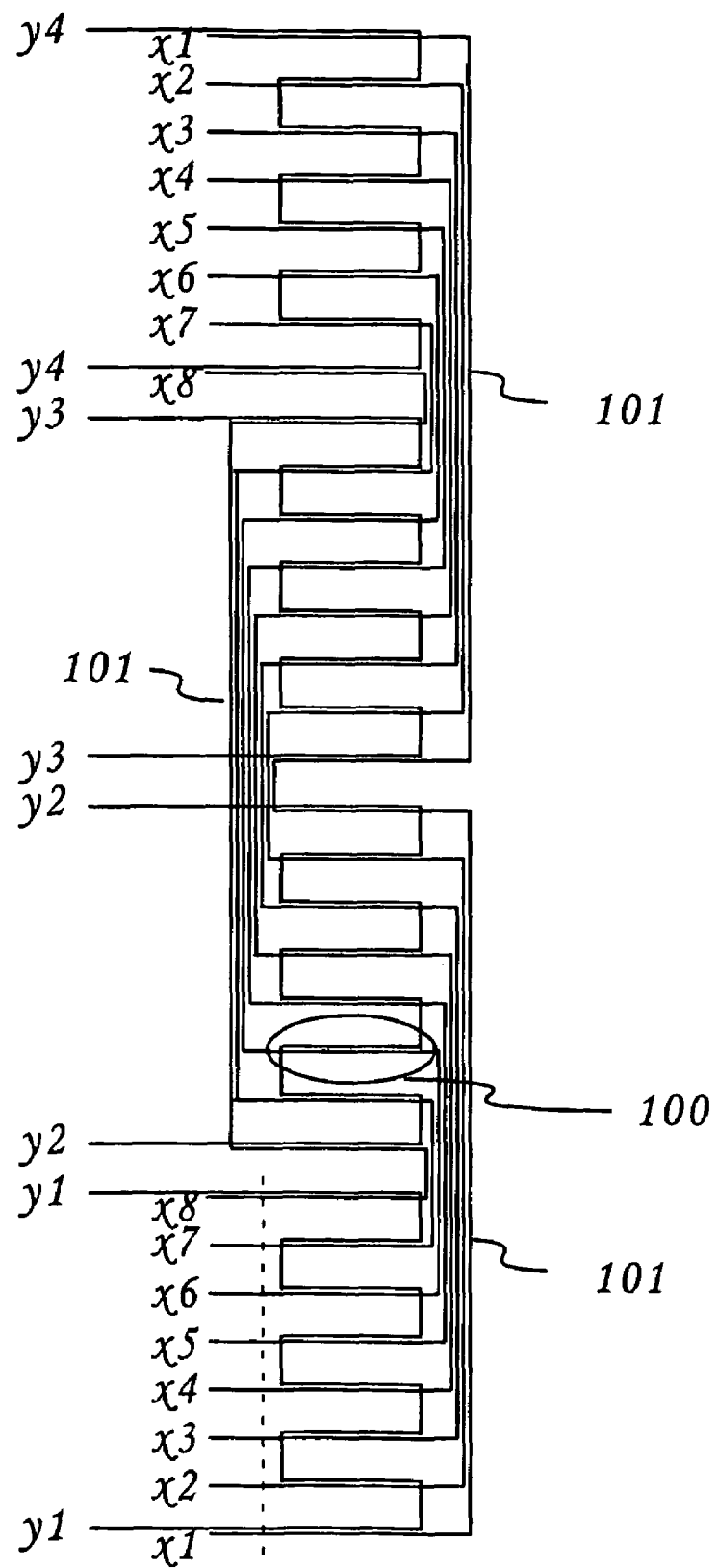
FIG. 4B illustrates a matrix conductor array example of a single track layout, in accordance with an embodiment of an aspect of the invention.

FIG. 4B illustrates a matrix conductor array example of a single track layout in accordance with an embodiment of an aspect of the invention. FIG. 4B further clarifies how the matrix approach can be laid out in a single track. Note that the specific single track layout of FIG. 4B (of x1-x8 over y1-y4 matrix) corresponds to the schematic matrix representation of the same x1-x8 over y1-y4 depicted in 4A.

The example illustrates the connecting links 101 between successive sets of domain conductors corresponding to x1-x8 and y1-y4, respectively. Note that these links 101 are perpendicular to the domain active conductors, and therefore have no impact on the data content. For example, the domain active conductors Y2 and X6 that control domain 100 are normal to links 101, and therefore currents flowing through links 101 have substantially no impact on the magnitudes of the currents flowing through X6 and Y2 conductors at location 100. Note that in the layout of FIG. 4B, each of the X and Y conductors (by this particular example, 4 and 8, altogether 12) have a square waveform-like shape, and that active conductor segments of each i,j, conductors (e.g. the conductors segments 100 that are associated with their domain) are placed proximate and substantially parallel to the domain (the domain is not depicted in FIG. 4B).

Note that in order to further reduce any registration of the links on the magnetic stripe material, these links can be placed on the back layer of the matrix substrate.

Those versed in the art will readily appreciate that the invention is not bound by the specific layout depicted in FIG. 4B.

Utilizing a conductor array in accordance with the embodiment of FIG. 4 constitutes a significant advantage over the conductor arrangement offered in the '659 PCT publication, in that it requires considerably lesser number of conductors and simpler associated electronics. Thus, a matrix having A rows and B columns can support up to A*B entries, i.e. bits. For instance, in the case of 500 bits, 1000 domains are required and, thus, a 32 over 32 matrix can be employed such that any one of the 1000 domains (or up to 1024 domains) is controlled by a unique (i,j) entry. Accordingly, 64 lines are required to write any desired bit in the series of 500 bits. Even if each entry is implemented by using 2 conductors (i.e. 2 conductors per domain, similar to the solution offered by the '659 PCT application) in order to facilitate inversion of current flow direction, still, a total of 64*2, i.e. 128 conductors are utilized compared to 2000 as was the case in the invention according to the '659 publication. Obviously, simpler associated electronics are required, e.g. fewer current drivers are required. Moreover, note that in order to write a bit value in location (i,j), the sum of the currents flowing through entry i and entry j should be high enough to overcome the coercivity of the magnetic domain that corresponds to the (i,j) bit. This necessarily entails that the current through each entry is of lesser intensity than the total current required overcoming the magnetic domain coercivity. Considering the lower current flow through each entry, this requires use of current drivers of lower power. Thus, this embodiment offers use of considerably fewer conductors, with simpler associated electronics that includes considerably fewer transistors, each of which support lower current. This necessarily entails that the a chip that accommodates the conductors and the associated electronics in accordance with this embodiment has considerably lesser manufacturing costs and, due to the lesser number of conductors, current drivers and the lower current intensity, it lowers the cost and complexity of each driver compared to that provided in accordance with that of the 659 publication.

Note that the invention is not bound by the specified matrix realization. Thus, for example the matrix is not necessarily confined to identical number of rows and columns. The current flowing through each entry is likewise not necessarily identical. In other words, it is not necessarily required to push half current intensity through the line entry and another half current intensity through the columns entry in order to bring about a full current intensity required to overcome the coersivity of a magnetic domain. By way of example, 0.75 intensity may be driven through the row entry and 0.25 intensity through the column. Of course, other variants are applicable as required and appropriate. Note that, when using non-identical currents, a careful design should avoid undesired scenarios in which one of the currents is too close to be able to overcome the coersivity. For example, having one current with 0.98 intensity and the other current with 0.02 appears to be risky, because in certain operational scenarios the 0.98 intensity current can overcome by itself the coersivity. The same consideration should apply to the utilization of non identical current in three-dimensional or greater matrix, as will be explained in greater detail below.

By way of another example, a three-dimensional matrix is employed, thus reducing even more the number of conductors that are used. For example, for 500 bits (or 1000 domains) a X*Y*Z matrix can be used with, 10 lines per dimension (supporting up to 1000 domains) giving rise to 30 (i.e. 10*3) lines. Even if using a bi-directional current switch on a single wire, such that two conductors are used (one for each current direction in accordance with the approach of the PCT publication), a total of 60 lines are required (i.e. 30*2), instead of 128 lines, as in the case of two-dimensional matrix exemplified above.

Figure 4C:
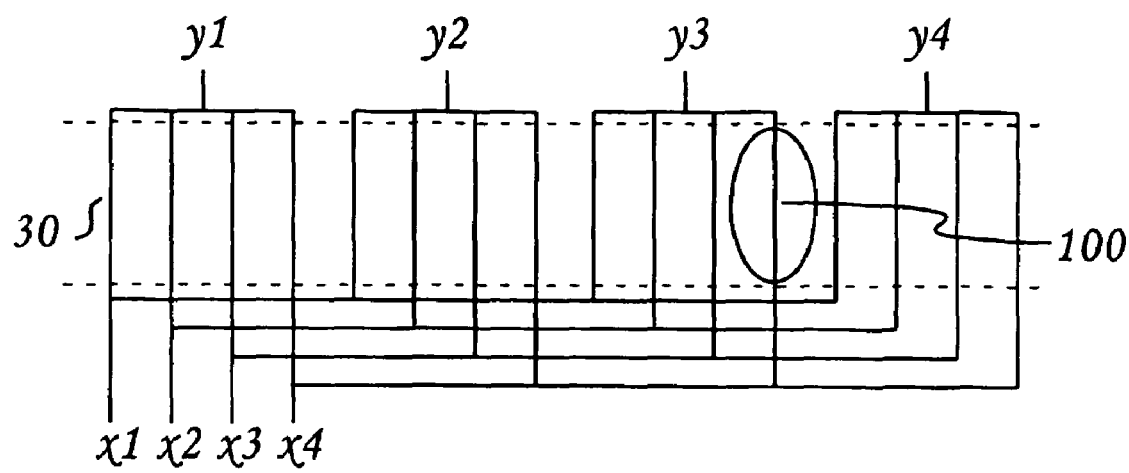
FIG. 4C illustrates yet another matrix conductor array example of a single track layout, in accordance with an embodiment of an aspect of the invention.

Another matrix example is illustrated in FIG. 4C. This matrix is two-dimensional and reduces the number of necessary drivers in the same manner as the matrix described in FIGS. 4A and 4B. However, the objective of this example is to emphasize a minimum number of conductors per bit. Consequently, a single conductor will be driven with enough current to overcome the coersivity of the magnetic stripe material, where the drivers y3 and x4 selectively drive conductor element 100. All drivers in this example are bidirectional and drive current in the direction dictated by the data content. The importance of this matrix example is for cases where the technology reaches yield degradation at the range of high conductor densities (more than one conductor per 5 mils).

Other bi-dimensional or multi-dimensional conductor array arrangements that are not necessarily confined to matrix configuration are applicable, all as required and appropriate.

Note that the invention is not bound by the specific architecture illustrated in FIG. 4A through 4C, in which the conductor array (being in accordance with one embodiment of the invention in the form of a matrix of conductors) is located below the magnetic stripe layer.

Figure 4D:
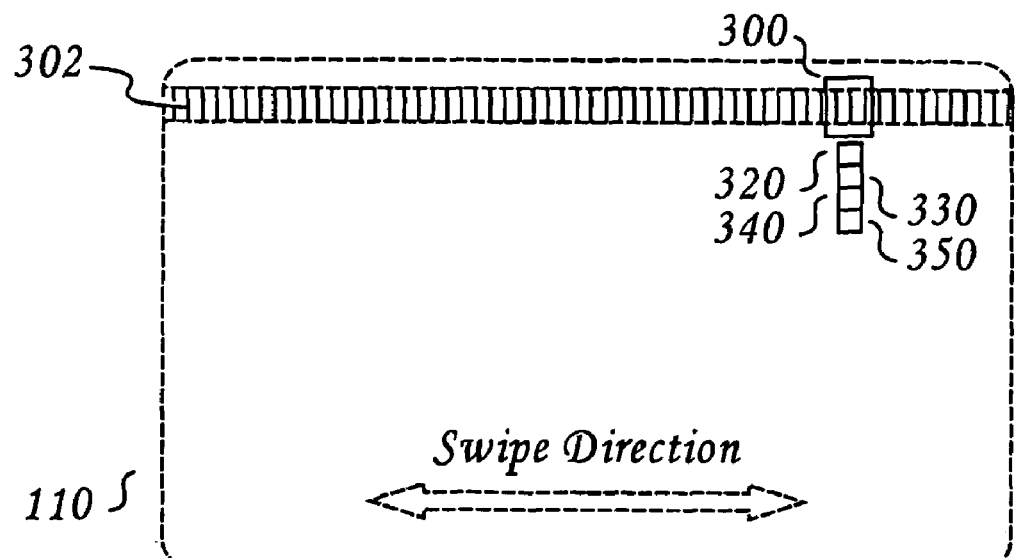
FIG. 4D illustrates a conductor dynamic magnetic stripe writer example with a synchronizing device to the swipe velocity, in accordance with an embodiment of an aspect of the invention.

The matrix form can be effectively used as a standard magnetic stripe card writer, as will be shown later. These magnetic stripe card writers are static in the sense that there are no moving parts. FIG. 4D shows a simple magnetic stripe writer that implements dynamic write conductor elements (320, 330, 340, and 350 shown one for each of the four tacks). These conductors and a swipe velocity synchronization device are mounted on a substrate 300 against which the card 110 is swiped. The card 110 has a longitudinal reference 302 that is read by the synchronization device. The synchronization device reads a linear location of the magnetic stripe, which is used to control the dynamic write rate of the conductor write elements. The linear reference can be best obtained optically, but other media is not precluded. Adjustment for the write conductor elements for air gap and intertrack leakage will be accomplished as necessary using ferromagnetic materials.

Figure 10:
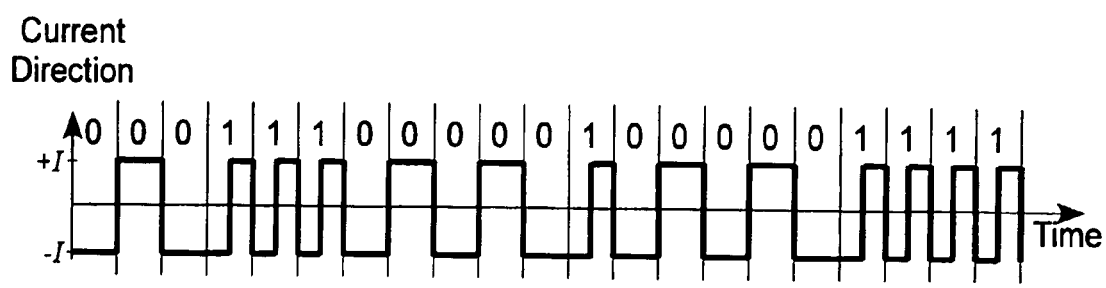
FIG. 10 illustrates a signal waveform in a coil for generating corresponding flux, as a function of time, where the flux is aimed at the read head of a standard magnetic stripe reader, in accordance with an embodiment of an aspect of the invention.

The conductor elements 320, 330, 340, and 350 are each driven by current that corresponds to the respective track data, as illustrated in FIG. 10 for example. The current generates a corresponding magnetic field as is the case in standard magnetic stripe write heads. As the card is being swiped the data segments are distributed along the track(s). The synchronization of the data rate to the swipe velocity ensures that the data is correctly distributed along the track(s).

Figure 3A:
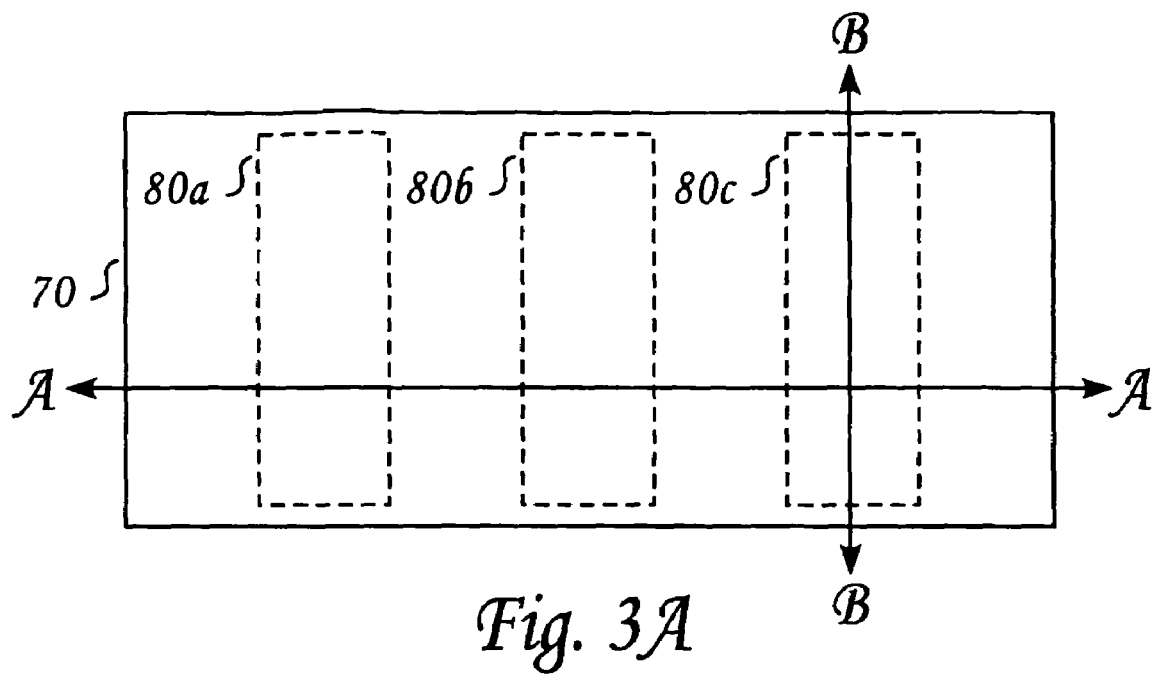
FIG. 3A illustrates a schematic view of a segment of one channel of an associated magnetic stripe in a smart card.
Figure 3B:
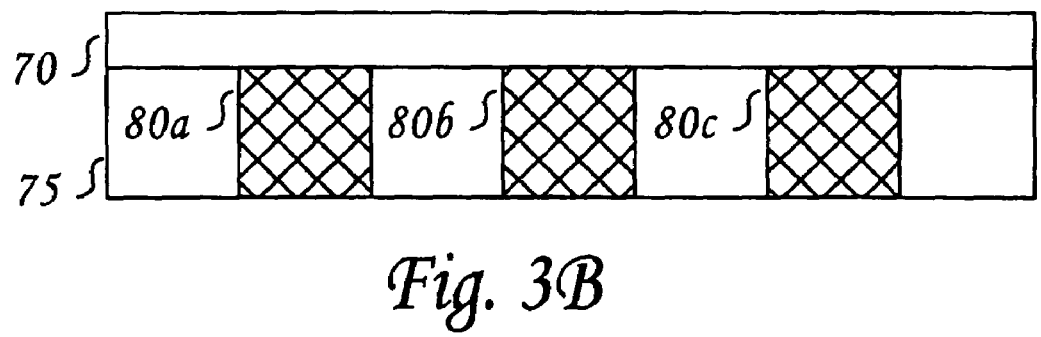
FIG. 3B illustrates a cross-section view along AA of the segment depicted in FIG. 3A.
Figure 3C:
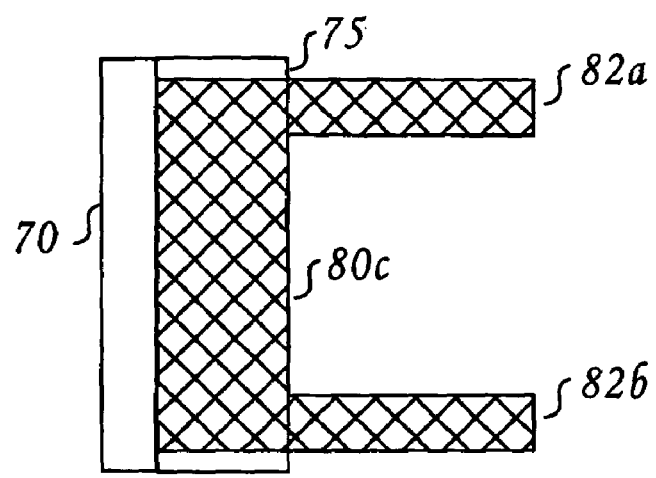
FIG. 3C illustrates a cross-section view along BB of the segment depicted in FIG. 3A.
Figure 3D:
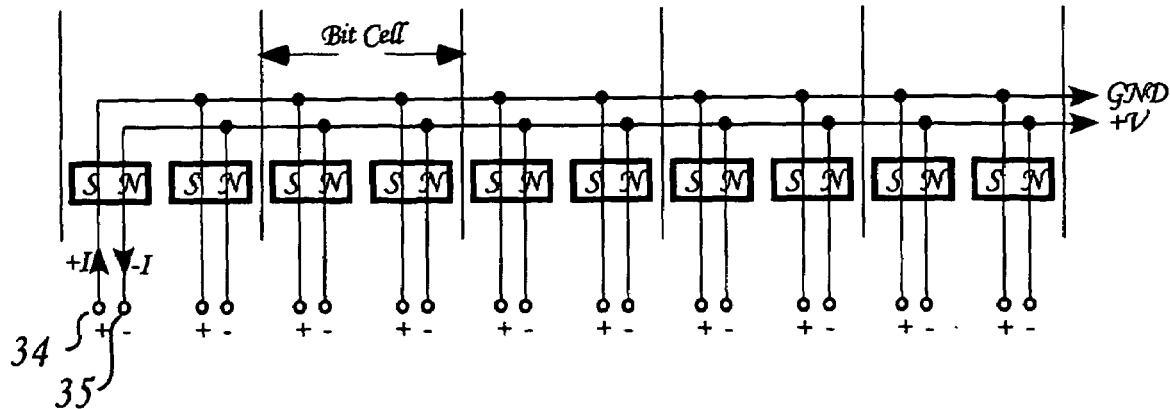
FIG. 3D illustrates a structure of magnetic domains forming part of a smart card, in accordance with the prior art.
Figure 3E:
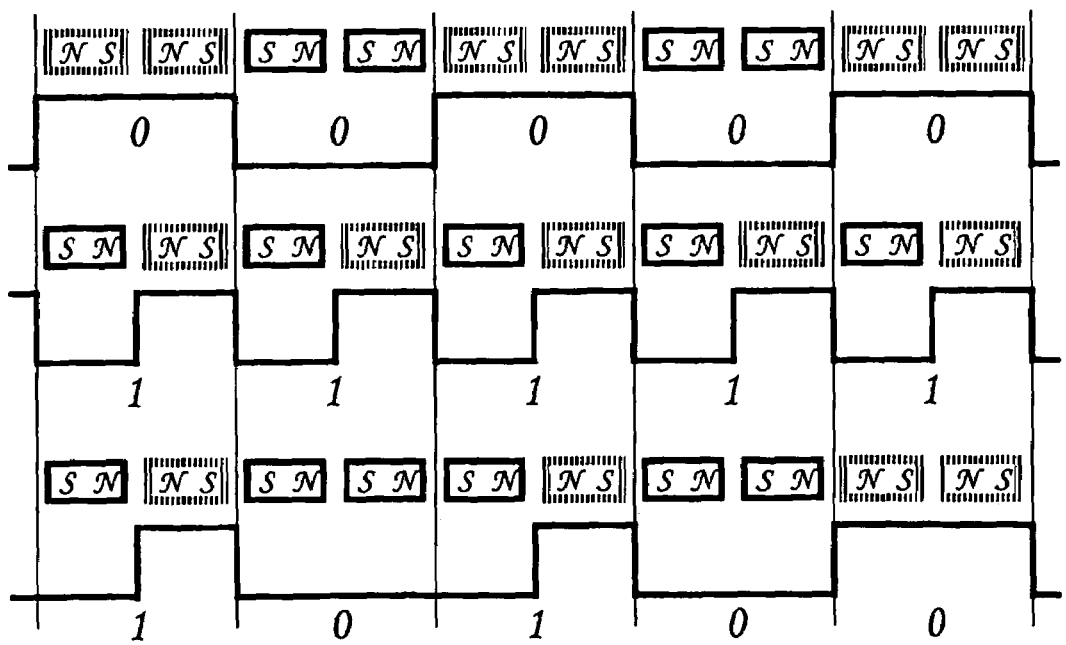
FIG. 3E illustrates a representation of encoded sequences of bits, in accordance with prior art Aiken Biphase encoding standard.
Figure 5A:
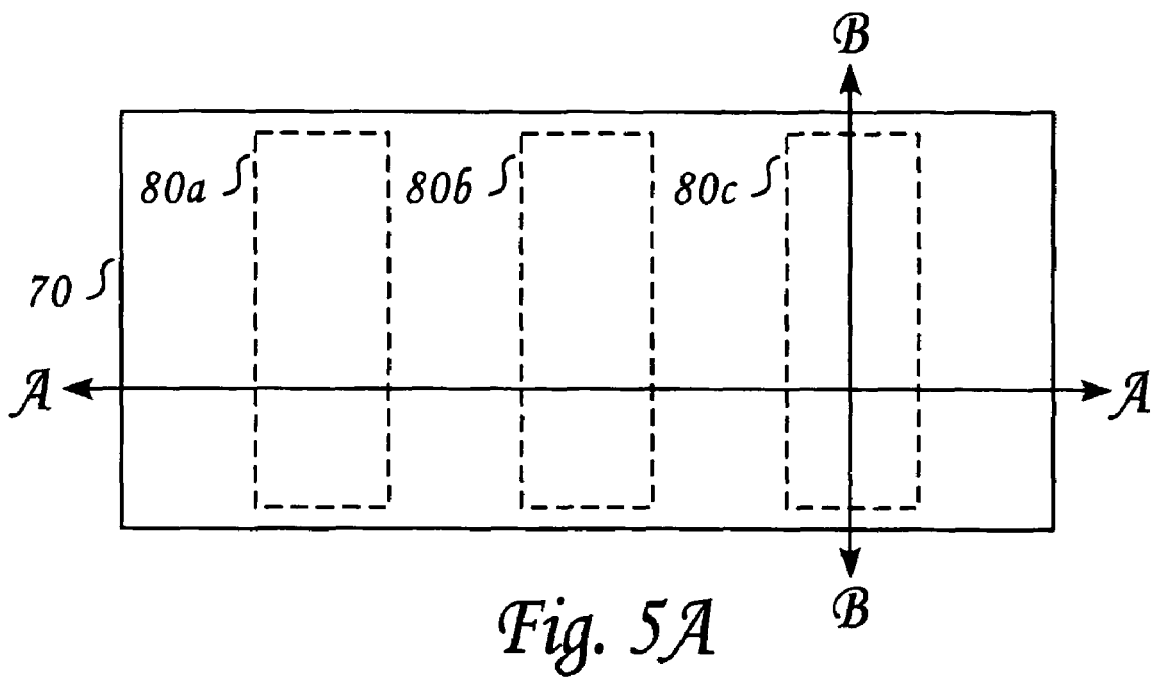
FIG. 5A illustrates a schematic view of a segment of one channel of a magnetic stripe in a smart card, in accordance with an embodiment of an aspect of the invention the invention.
Figure 5B:
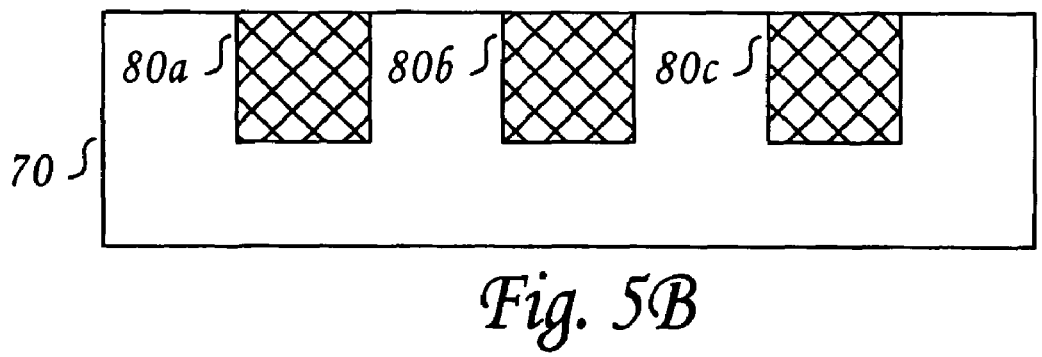
FIG. 5B illustrates a cross-section view along AA of the segment depicted in FIG. 5A.
Figure 5C:
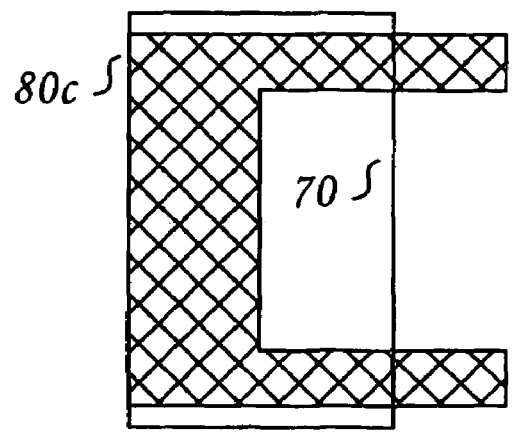
FIG. 5C illustrates a cross-section view along BB of the segment depicted in FIG. 5A.

In accordance with the invention, FIG. 5, FIG. 5B and FIG. 5C representing another example arrangement of magnetic stripe and conductors. The arrangement according to FIGS. 5A-C is similar to FIGS. 3A-C, except that the magnetic stripe material 70 is in the layer underneath and between the conductors. The results are very similar to the first embodiment except that the resulting polarity is reversed, as evident in FIG. 6.

Those versed in the art will readily appreciate that the various embodiments discussed above are only few out of many exemplary configurations of a conductor array proximate to the magnetic stripe material for the purpose of writing data onto the magnetic stripe, in accordance with the first aspect of the invention.

In accordance with a non-limiting application of an improved smart card (described, for example, with reference to the first aspect of the invention), a single smart card can substitute the function of multiple magnetic stripe cards (serving thus as a multi-card) and allow the user to easily change the card's identity/function using the smart card's input/output interfaces, such as a built-in keyboard or display. In other words, a single smart card can store data indicative of plurality of magnetic cards (say of many credit cards) and whenever the card holder wishes to use a given magnetic card, the appropriate data (corresponding to the magnetic card of interest) is written onto the magnetic stripe and can be read by conventional magnetic card reader. The invention is, of course, not bound by this application.

In accordance with a-second aspect of the invention, and as will be explained in greater detail below, there is provided a static emulation of a magnetic stripe by current magnitude and direction control in a conductor retained for the duration of the reading of the emulated magnetic stripe, where the generated magnetic field should substantially correspond to the mapping of bits on a magnetic stripe, in accordance with the standard. Note that the magnetic stripe material is absent, as its functionality is being emulated.

Figure 1:
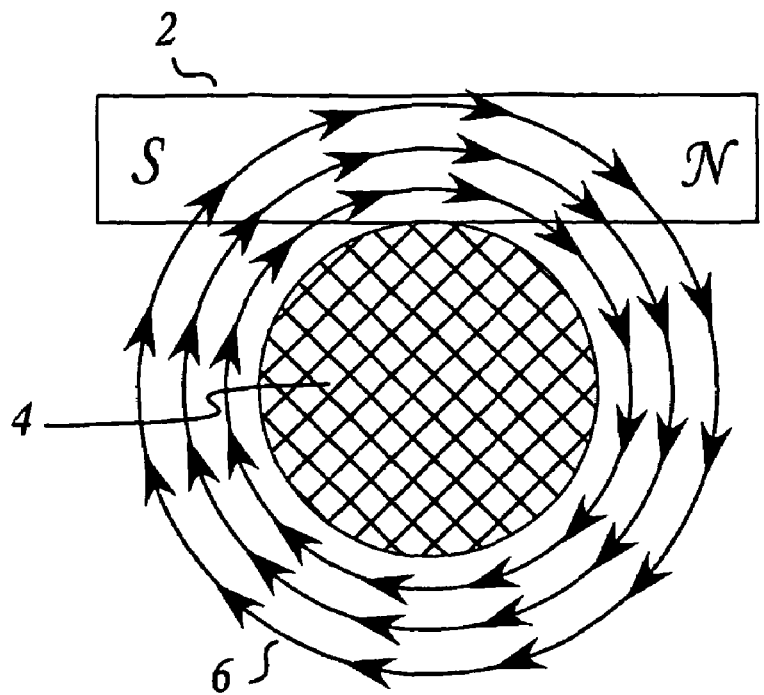
FIG. 1 illustrates a cross-section front view of a conductor and related magnetic field for illustrating the principles of magnetism, electric current, and the relationship between them.
Figure 6:
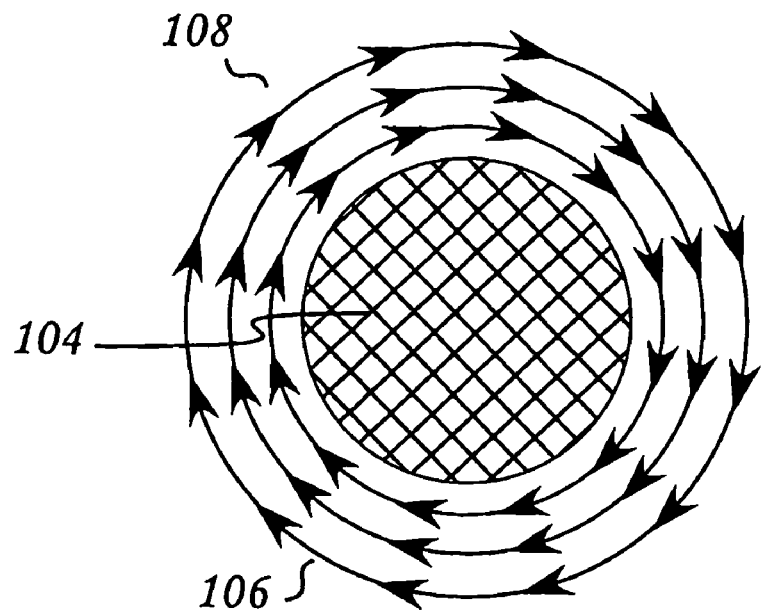
FIG. 6 illustrates a cross-section front view of a conductor and related magnetic field, which will serve in understanding the operation of certain embodiments of an aspect of the invention.
Figure 7:
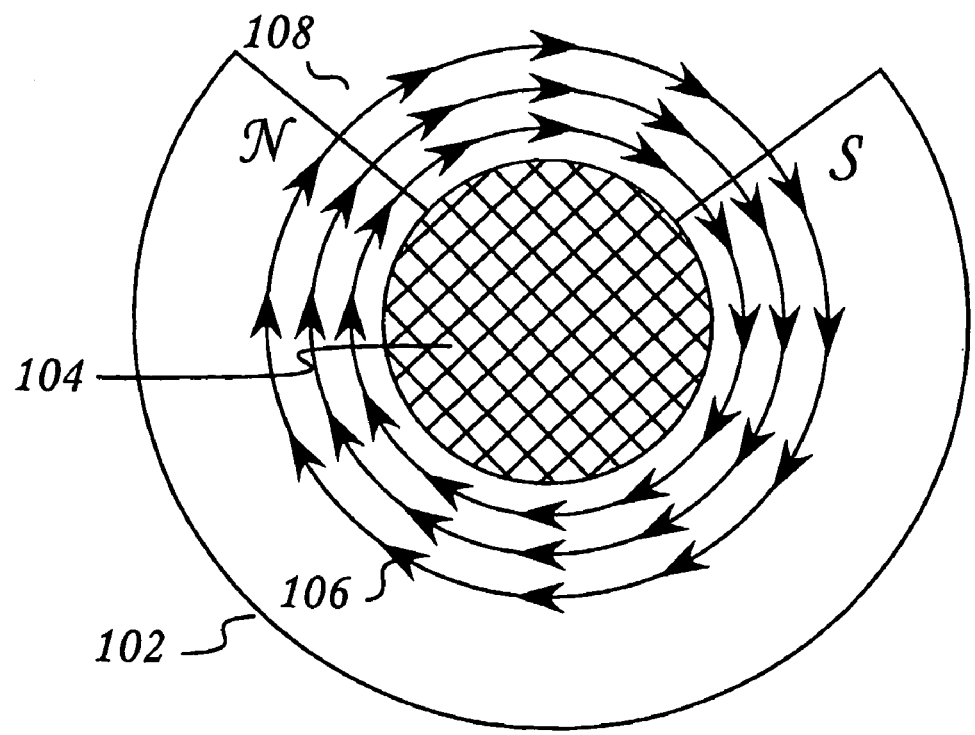
FIG. 7 illustrates a cross-section front view of a conductor and related magnetic field, which will serve in understanding the operation of certain embodiments of an aspect of the invention.

For a better understanding of the second aspect of the invention, FIG. 6 illustrates how a conductor 104 generates a magnetic field 106 at the air gap 108 where the direction of the magnetic field 106 H is clockwise, as indicated by the arrows on the magnetic field lines 106, and corresponds to a current direction in the conductor 104 that is perpendicular to the page and flows in the direction from the viewer into the page. Note that, generally, the operation in accordance with FIG. 7 is similar to that of FIG. 1, except for the fact that in the latter the magnetic field is generated on the magnetic stripe. As will be explained in greater detail below, using a magnetic field generated at the air gap would facilitate use of lower currents, thereby further simplifying the associated electronics and extending battery lifespan.

FIG. 7 illustrates how a conductor 104 that is partially surrounded by ferromagnetic material 102 generates a magnetic field 106 at the air gap 108, with the North Pole (N) to the left and the South Pole (S) to the right of the conductor 104. The use of ferromagnetic material that partially surrounds the conductor (compared to free air that entirely surrounds the conductor, as is the case in FIG. 6), intensifies the magnitude of the magnetic field generated at air gap 108. It should be noted that the invention is not bound by any specific type of ferromagnetic material and not by the specific geometry as illustrated in FIG. 7. For example, the sector size of the ferromagnetic material and/or the geometrical shape thereof may vary depending upon the particular application.

Figure 8A:
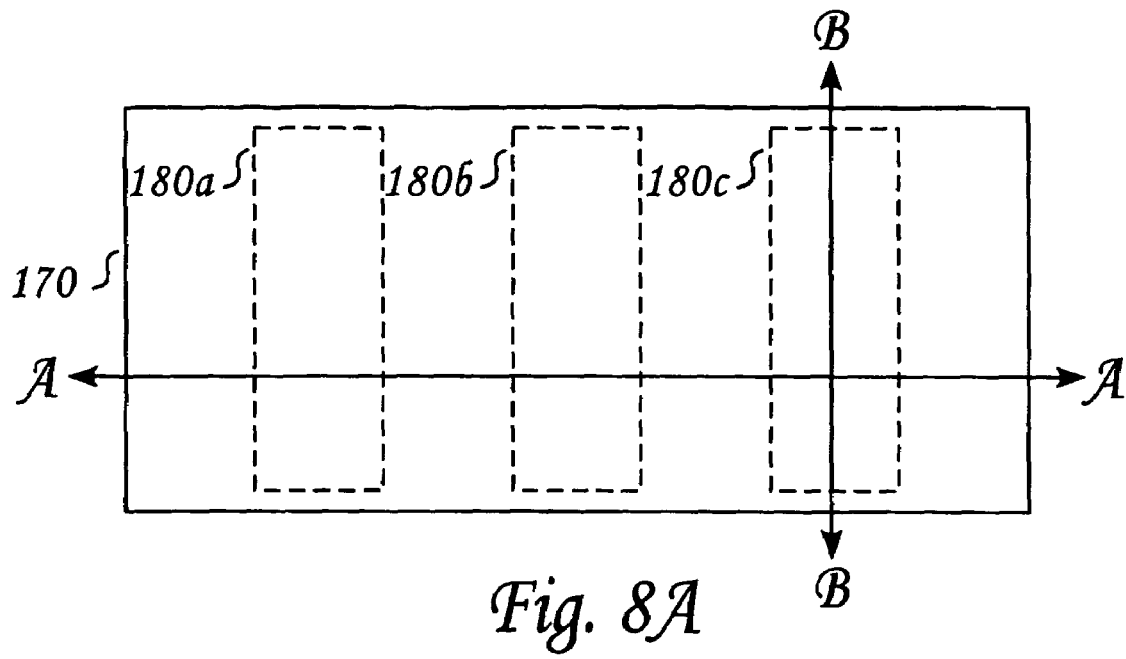
FIG. 8A illustrates a schematic view of a segment of one channel, in accordance with an embodiment of an aspect of the invention.

Bearing all this in mind, FIG. 8A, illustrates a schematic view of a segment of one channel, in accordance with an embodiment of the second aspect of the invention.

Figure 2:
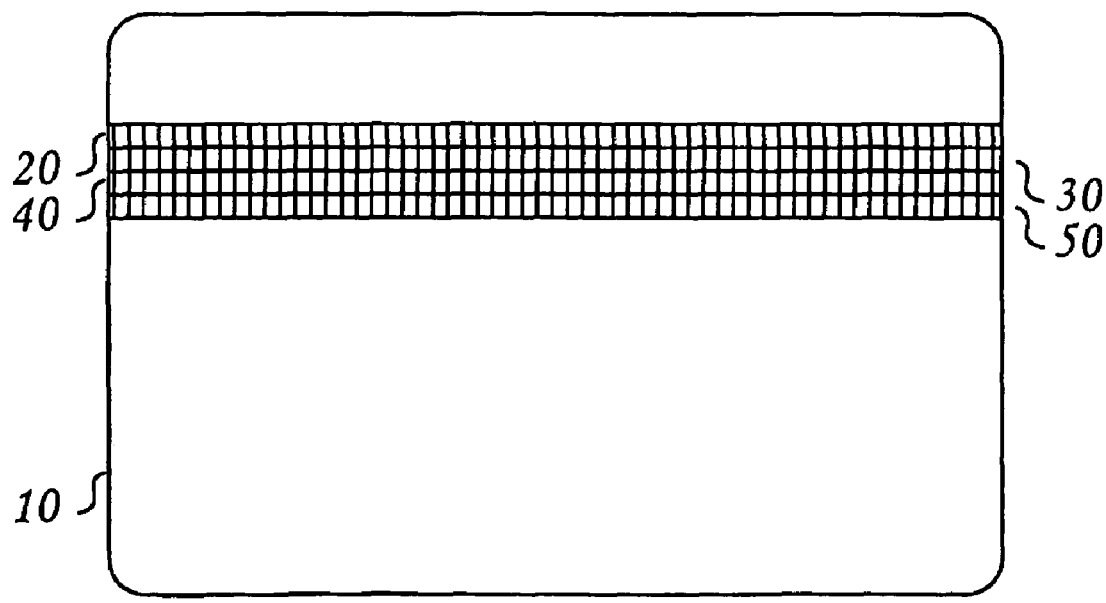
FIG. 2 illustrates schematically an exemplary card with four channels and associated magnetic stripe.
Figure 8B:
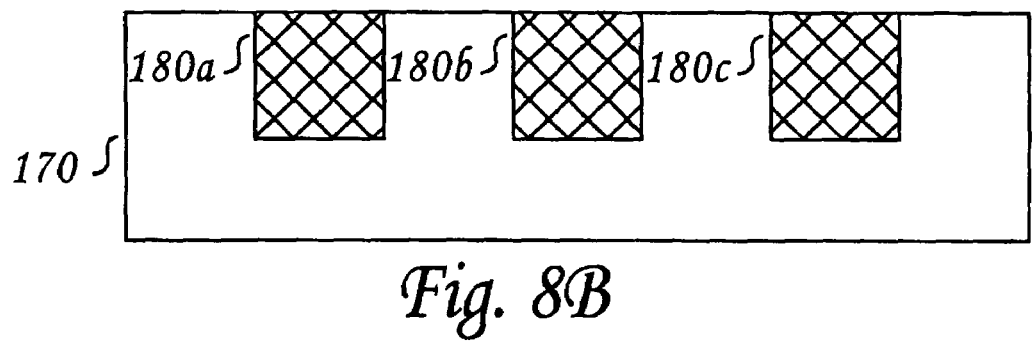
FIG. 8B illustrates a cross-section view along AA of the segment depicted in FIG. 8A.
Figure 8C:
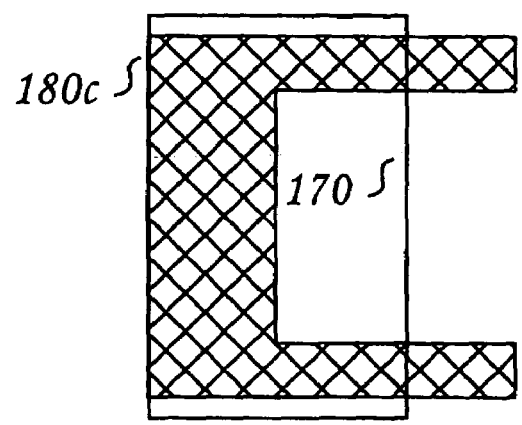
FIG. 8C illustrates a cross-section view along BB of the segment depicted in FIG. 8A.

In accordance with this embodiment there is provided a static magnetic stripe emulation, obviating the need of using magnetic stripe material. By this embodiment, an array of conductors 180a, 180b, and 180c, shown in FIGS. 8A-C are embedded in a nonconductive material 170 proximate the surface of the smart card's enclosure, and spaced corresponding to the data poles on the emulated magnetic stripe. The conductor array is designed such that it will generate the magnetic field in the air at an area that corresponds to the channel tracks, e.g. 20, 30, 40, and 50 of the magnetic stripe in FIG. 2. Current flowing in each of these conductors in directions that correspond to the data bits being emulated, generate a magnetic field in the air (as was described with reference to FIG. 6) along each track such that they can be read by a magnetic stripe reader. Note that because the magnetic field generated need only be read by a sensitive read head of the magnetic stripe reader, it is not required to overcome the coersivity of magnetic stripe material (as was the case with the embodiments in accordance with the first aspect of the invention as well as the prior art 659 publication) because the currents required are very low. By way of non limiting example, in certain embodiments in accordance with first aspect of the invention, the current flowing through each conductor is of the magnitude range of about 300 mA-1A. In contrast, in accordance with certain embodiments of the second aspect of the invention, the current flowing through each conductor is of the magnitude of about 1 mA. The specified magnitudes are mentioned for illustrative purposes and are by no means binding.

In operation, the user indicates the specific card that is to be used (say, VISA™ credit card), including PIN and/or finger print to identify an authorized user. In response, the processor retrieves from the storage (both forming part of the credit card) data indicative of the VISA™ credit card. In the case that the storage stores data indicative of a plurality of credit cards, the data indicative of the sought VISA™ credit card is identified and retrieved. This operational scenario is by no means limiting and other examples are illustrated by way of non limiting examples with reference to FIGS. 16 and 17, below. Now, when the user swipes the card in the reader, the processor controls the current flow through the array of conductors to generate a magnetic field with S/N polarity that corresponds to the data bits of the emulated VISA™ credit card. By one embodiment, the conductor array and the associated electronics (for writing a bit value of '0' or '1') are similar to that of the 659 publication. In accordance with another embodiment of the second aspect of the invention, a matrix array configuration (of the kind described in detail with reference to the first aspect above) may be employed, thereby reducing the number of conductors and their associated current drivers, all as discussed in detail above.

Note that the static emulation must operate when the card is swiped through the card reader. The emulation can commence shortly before or simultaneously with the swiping of the card through the reader, and the emulation can end when the data is properly read, or shortly after the card has been swiped through the reader. The emulation can likewise be achieved when the current in the conductors is applied sequentially, provided that the sequencing rate is not impacting normal swipe rates. The start/stop of emulation can be automatic or by a user initiated command.

The use of low currents constitutes an advantage, as compared to the use of high currents, because the associated electronics (including the power drivers) is considerably simpler (e.g. transistors compared to power transistors), giving rise to smaller real-estate chip space and consequently lower manufacturing costs. Moreover, utilizing lower currents gives rise to longer battery lifespan. As may be recalled, in accordance with the second aspect of the invention, currents are sustained during the reading process. The reading process may be interrupted by the existing external magnetic fields (due to the lower currents that are used) and, accordingly, if desired, higher currents may be employed, all depending upon the particular application.

In accordance with a third aspect of the invention, there is provided a dynamic emulation of a magnetic stripe by the current's magnitude control and its direction in a conductor. The current's polarity changes in accordance with the data and at a rate determined to be appropriate for a typical magnetic stripe reader. This constitutes a variable magnetic field burst, corresponding to the data to be delivered to the magnetic stripe reader, which is repeated, if necessary, at least for the duration of the reading of the emulated magnetic stripe.

Figure 9:
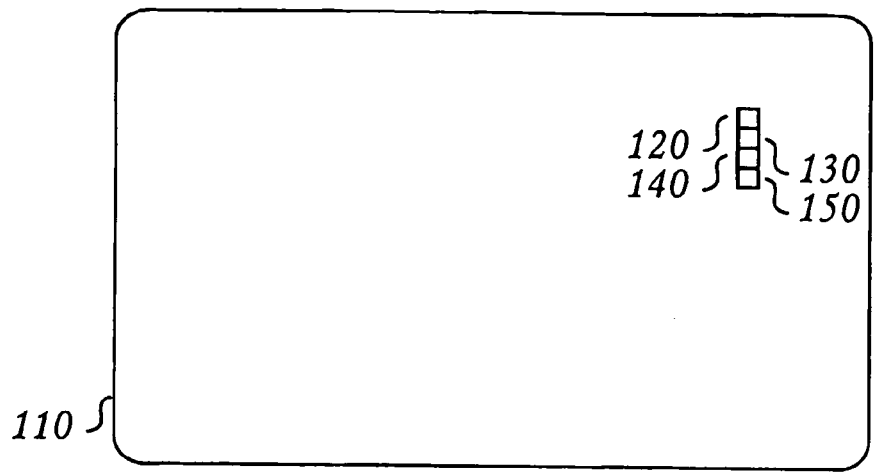
FIG. 9 illustrates schematically an exemplary card with four channels, in accordance with an embodiment of an aspect of the invention.

An embodiment of the third aspect of the invention is based on a dynamic emulation of a magnetic stripe, and obviates the act of swiping. FIG. 9 illustrates an embodiment of a smart card 110 in which the four track (channel) magnetic stripe has been substituted with four electromagnetic transducers such as sections of conductors 120, 130, 140, and 150 surrounded by ferromagnetic material, as shown in FIG. 7, or in accordance with another embodiment without the ferromagnetic material (as shown in FIG. 6) . Note that in FIG. 6, the air surrounding the conductor is used for illustrative purposes only. In practice a material that will have no substantial effect on the magnetic field (such as non Ferromagnetic material) is used to surround selected sectors of the conductor. Note also that the invention (in accordance with the third aspect) is not bound by specific configurations of FIGS. 6 and 7.

In operation, the card is placed in a conventional magnetic stripe reader in a manner that brings the conductors 120, 130, 140, and 150 proximate to the reading head of the reader. The smart card emulates the swiping action of a magnetic stripe by generating the same varying magnetic field as that of a magnetic stripe being swiped in the vicinity of the read-head. The varying magnetic field is induced by an electromagnetic transducer and is controlled by the transducer's driver in the direction and intensity of the current. For four magnetic stripe channels, four such transducers 120, 130, 140, and 150 and drivers are used. Note that the conductors have to be placed vis-á-vis the reader and, if reading does not occur, i.e. the conductors are displaced relative to the read head, the magnitude of the magnetic field sensed by the magnetic head reader may be too low. In this case the user will have to repeat the procedure until the data is successfully read.

For a better understanding of the foregoing, refer to FIG. 10 which illustrates current polarity in a conductor for generating corresponding flux as a function of time, where the flux is aimed at the read head of a standard magnetic stripe reader, in accordance with an embodiment of an aspect of the invention. The current is driven to the coil, and the resulting flux corresponds directly in amplitude and direction to the current generating it. Note, that in the signal illustrated in FIG. 10, the frequency of the '0' is half that of the '1', which is in compliance with the Aiken Biphase encoding standard, giving rise to appropriate interpretation of the '0' and '1' bits by a standard magnetic reader. The generation of a signal of the kind depicted in FIG. 10 is generally known per se, and therefore will not be further expounded upon herein.

The invention is, of course, not bound by this particular Aiken Biphase encoding scheme.

Note that the rate of change of the current, and consequently the flux, represents the swiping action of a standard card. The baud rate (the reciprocal of the shortest time between two sequential transitions i.e. equivalent to one domain being swept) of the data stream being generated by the smart card can be set to any value desired, within the rate range set by the standards. Typically, although not necessarily, it should be set to a safe value around the middle of the range. Once set, it will be consistently repeated every time the card is used, with drifts confined to the tolerance of the internal card's clock.

The baud rate of data generated by the write head of the magnetic stripe card writer is determined by the manufacturer of the magnetic stripe card writer. The smart card will synchronize to that rate in a similar fashion as a magnetic stripe card reader synchronizes to the data baud rate determined by the swipe velocity of the card. The format of the data transfer is specified in great detail in the standards. The standard includes a preamble of zeros for synchronization. However, custom format outside the specifications of the standards (which is often necessary for track 3) are possible.

In accordance with certain embodiments of this aspect of the invention, it is possible to employ a single conductor per track, and to feed through the conductor variable currents indicative of the series of bits that are normally accommodated in a credit card track (say, 500 bits, as described in the examples above), as depicted, for example, in the description with reference to FIG. 10. Note that, similar to the second aspect of the invention, the dynamic emulation, in accordance with the third aspect, can take place substantially during the use of the card, and need not be activated when the card is not in use, thereby saving power consumption.

The invention in accordance with this aspect constitutes a significant advantage in that only few conductors are used and, accordingly, a very simple associated electronics circuitry is required to drive currents to the conductors. This exhibits even greater current savings and further reduces the number of current drivers, compared to the static emulation, in accordance with the second aspect of the invention (the latter, as may be recalled, constitutes a significant current savings over hitherto known solutions). The current consumption in accordance with the third aspect of the invention is reduced because the data is presented sequentially, i.e. in certain embodiments no more than one bit is generated at a time, compared to all the bits generated simultaneously, in accordance with certain embodiments of the second aspect of the invention.

Note also that by this embodiment of the third aspect of the present invention, the card can be placed in a selected stationary position inside the reader, thereby obviating the need to swipe the card in the reader. This may constitute an advantage for users who are unable to swipe the card rapidly in the reader (e.g. those suffering from motoric disorders), and now find it unnecessary to perform repeated attempts to swipe the card until the data is duly read by the reader. What would be required in accordance with this embodiment is simply to place the card inside the reader (preferably, although not necessarily, in the center), and the data will be conveyed to the reader by means of the dynamic emulation described above.

Figure 11:
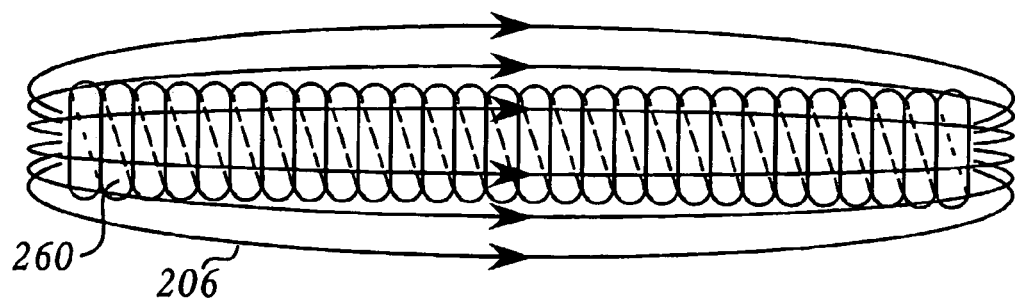
FIG. 11 illustrates a conductor for use in a smart card, in accordance with an embodiment of the invention.

By another embodiment of the third aspect of the invention, a magnetic field representing the data extends along a longer segment of the smart card, mimicking the same location where a standard magnetic stripe would be placed. FIG. 11 illustrates a single track of elongated magnetic field generated by an electromagnetic transducer, such as a solenoid/coil 260 (constituting an elongated conductor) that functions substantially equivalent to multiple conductors of the kind depicted in FIG. 6. The current flowing through the elongated conductor flows in the same direction as that which flows through the equivalent multiple of conductors. The resulting magnetic field 206 can be adjusted to certain boundaries by the use of ferromagnetic material, as at least one of a core of the solenoid/coil and external to the solenoid/coil. The ferromagnetic material can be used to isolate magnetically one track from another, and the material is placed between the coils. This may be necessary to separate the magnetic fields of two adjacent tracks. The utilization of the magnetic material in the manner specified can be, e.g. (but not limited to) in accordance with the teachings of techniques used for magnetic flux control and electrical shielding.

Figure 12:
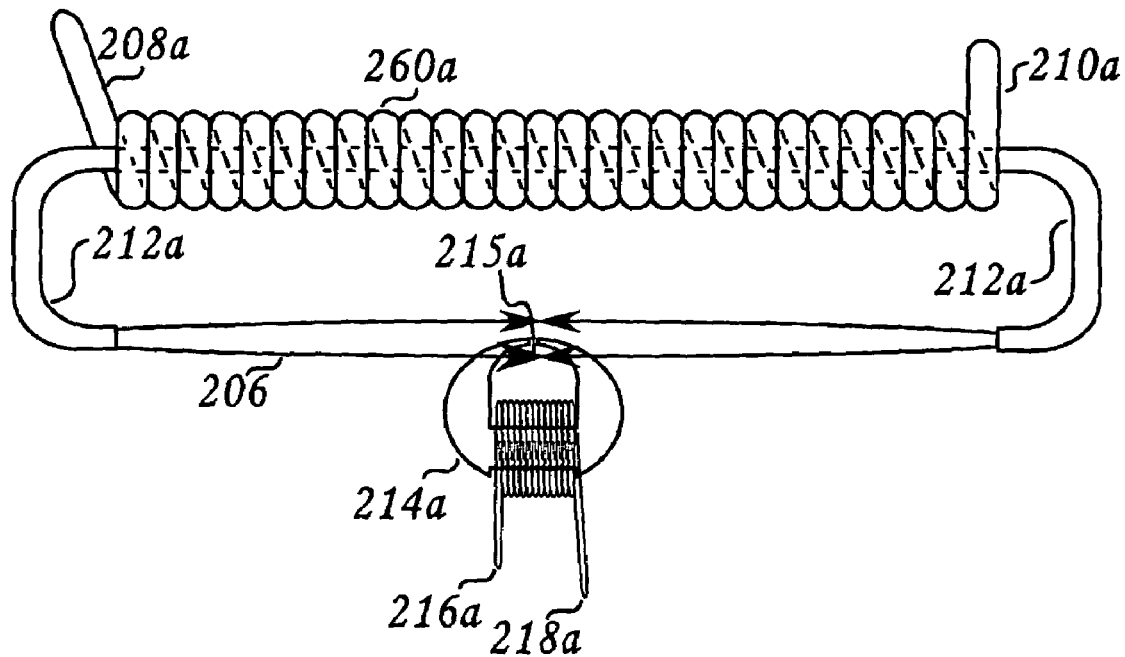
FIG. 12 illustrates a view of a coil with a C-shaped core, relative to the read head of a standard magnetic stripe reader, in accordance with an embodiment of an aspect of the invention.

For a better understanding of the operation of the embodiment of FIG. 11, attention is drawn to FIG. 12, which illustrates an example of how information is transferred between a coil 260*a* using a C core 212*a* and a typical read head 214*a* in a magnetic stripe reader. A current passed through the coil 260*a* using the coil terminals 208*a* and 210*a* results in flux 206. The direction of the flux 206 varies in accordance to the current direction in the coil 260*a*, e.g. according to the exemplary pattern described above with reference to FIG. 10. Note that the current is driven into the coil terminals 208*a* and 210*a*. The air gap 215*a* of the read head 214*a* of the reader is positioned in the path of the flux 206 and, as a result, a corresponding data signal is induced on the read head's coil terminals 216*a* and 218*a*, which is subsequently processed by the magnetic stripe reader's electronics (not shown). Ferromagnetic materials such as metal, ferrite, etc., as well as electrical shielding techniques, can be used to fine tune the path of the flux for optimal performance.

Figure 13:
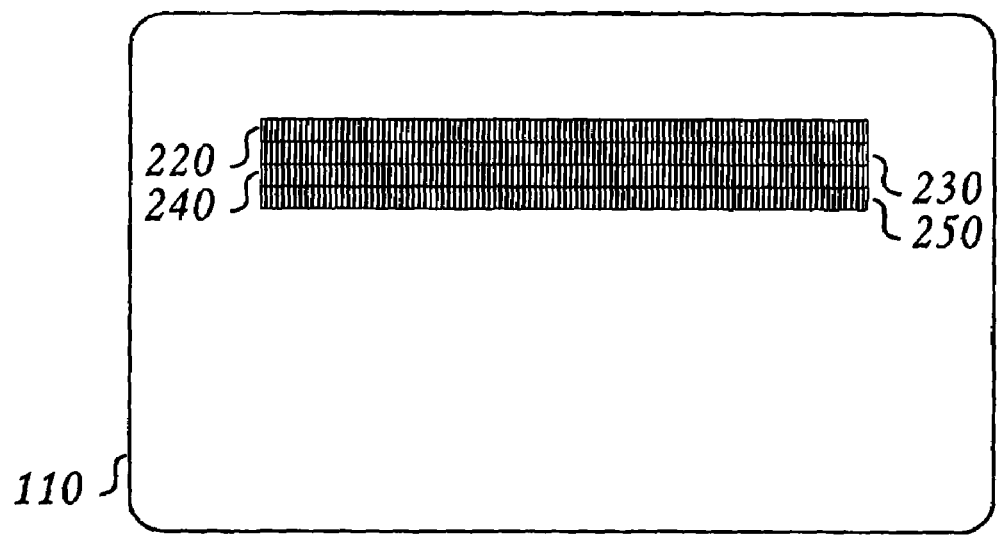
FIG. 13 illustrates schematically an exemplary card with four channels, in accordance with an embodiment of an aspect of the invention.

FIG. 13 illustrates schematically a four track (channel) 220, 230, 240, and 250 smart card 110 that utilizes an elongated conductor of the kind depicted in FIGS. 11 and 12. Note that, if desired, the elongated conductor does not necessarily extend through the entire track and, accordingly, by way of another embodiment, the elongated conductor is replaced by two or more shorter conductors that are placed side by side.

By the embodiment described with reference to FIGS. 11 to 13, the card can be placed in the reader in a motionless manner (as was the case with the embodiment described with reference to FIG. 9); however, considering that the elongated conductor provides the same information throughout its longitudinal extent, the card can be placed substantially at any stationary position inside the reader, thereby obviating the need to swipe the card in the reader. This may constitute an advantage for users who are unable to swipe the card rapidly in the reader (e.g. those suffering from motoric disorders) and now find it unnecessary to perform repeated attempts to swipe the card until the data is duly read by the reader. What would be required in accordance with this embodiment is simply to place the card inside the reader and the data will be conveyed to the reader by means of the dynamic emulation described above.

If desired, the card can be swiped in the conventional manner. This is because the elongated conductor provides the same information throughout its longitudinal extent while the card is swiped.

Figure 14:
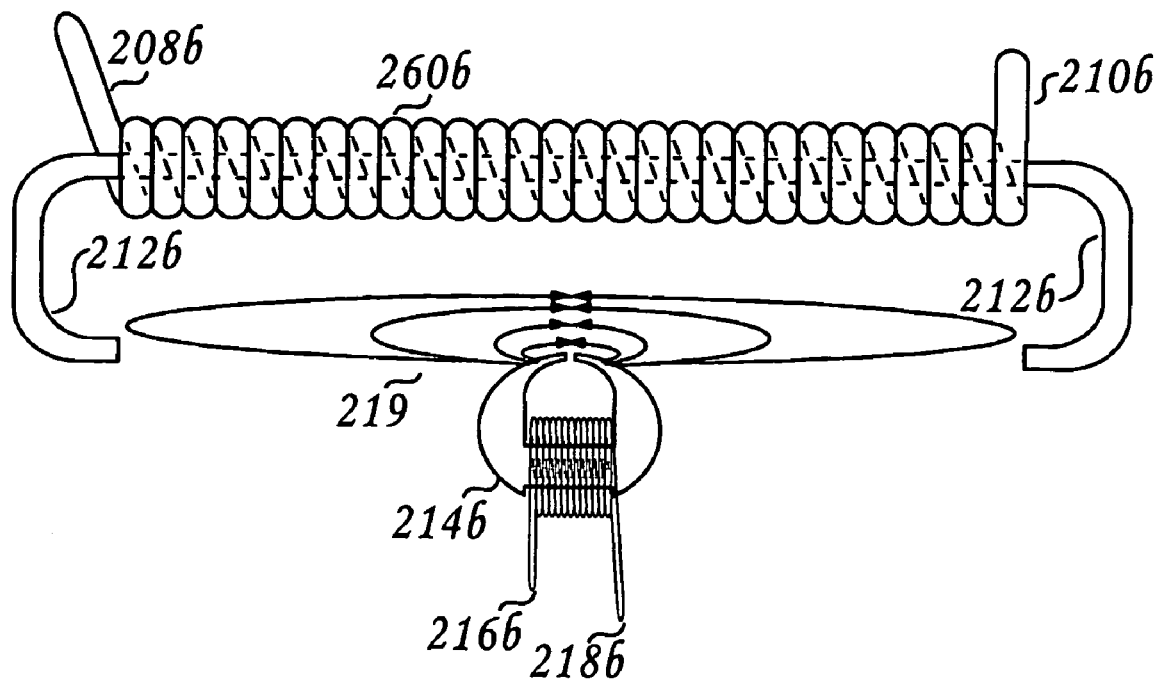
FIG. 14 illustrates a view of a coil with a C shape core relative to the write head of a standard magnetic stripe writer, in accordance with an embodiment of an aspect of the invention.

Attention is now drawn to FIG. 14, which illustrates an embodiment in accordance with another aspect of the invention. By this embodiment, the elongated conductor (e.g. that described with reference to FIG. 12, above) is used to transfer data from a standard magnetic card writer to the smart card. In other words, a conventional magnetic stripe writer conveys data to the smart card using the magnetic coupling between the write head and the elongated conductor.

In operation, a magnetic flux 219 emanates from the conventional magnetic write head 214*b*. The magnetic flux corresponds to the current direction to the write head's coil terminals 216*b* and 218*b*. The flux 219 is sensed by the C core 212*b* and the coil 260*b*, resulting in data signals at the coil terminals 208*b* and 210*b*. By following this approach, data is written to the smart card, using a conventional magnetic write head. Using a standard magnetic write head for writing data to a smart card is not limited to the specific implementation described with reference to FIG. 14.

As may be recalled, hitherto known techniques for writing data into smart cards employ transmitting data through designated interface pin(s) for contact smart cards, or communicating by electromagnetic signals from external card interface for contactless cards. In accordance with this aspect of the invention, there is provided yet another means for writing data to smart cards, using standard magnetic write head. As explained above, with reference to the third aspect of the invention, the smart cards that are used are simple, inexpensive, and consume very low power, thereby constituting advantage over other known smart cards.

By a modified embodiment, a read/write functionality is provided, where the smart card of the kind described in a non limiting manner with reference to FIGS. 11 and 12 is used with a standard magnetic head reader for reading data of interest, (e.g. VISA™ credit card data stored therein), and using a standard magnetic write head, new (or modified) data can be written onto the smart card, using, for example, the technique described in a non-limiting manner, with reference to FIG. 14.

Thus, for example, this embodiment also allows a conventional magnetic stripe writer to convey data to the smart card using the magnetic coupling of the write head with the four track channel transducers 220, 230, 240, and 250 (see FIG. 13). These transducers are compatible with a conventional magnetic stripe reader and writer for two-way data transfer to and from a smart card.

Still further, there is provided in accordance with another aspect of the invention a new type of magnetic stripe card writer, with no moving parts. The new type of writer includes a conductor array being external to the card and used as a magnetic stripe writer onto standard magnetic stripe cards.

Figure 15A:
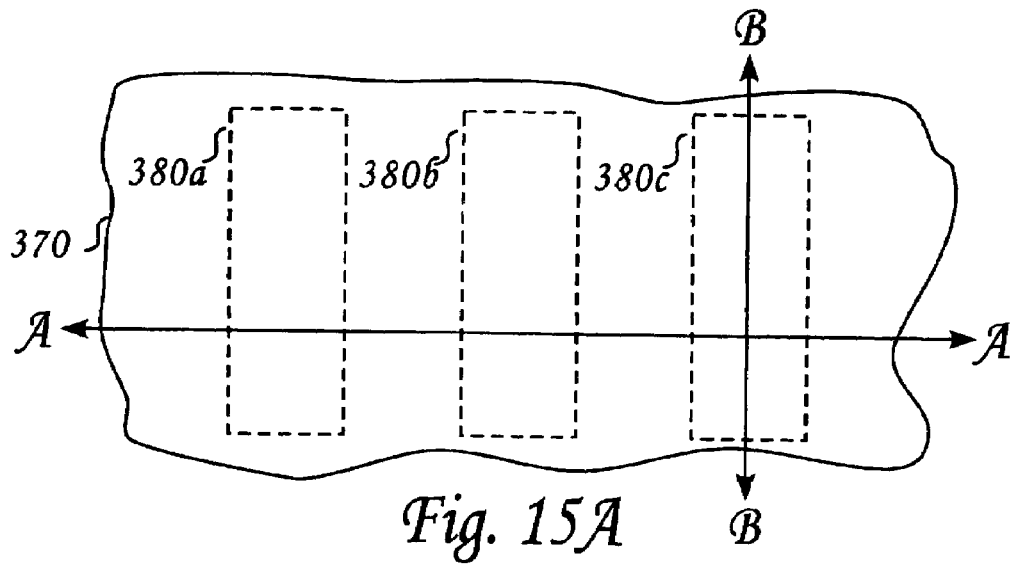
FIG. 15A illustrates a schematic view of a segment of one channel of the magnetic stripe writer and proximate magnetic stripe card, in accordance with an embodiment of an aspect of the invention.
Figure 15B:
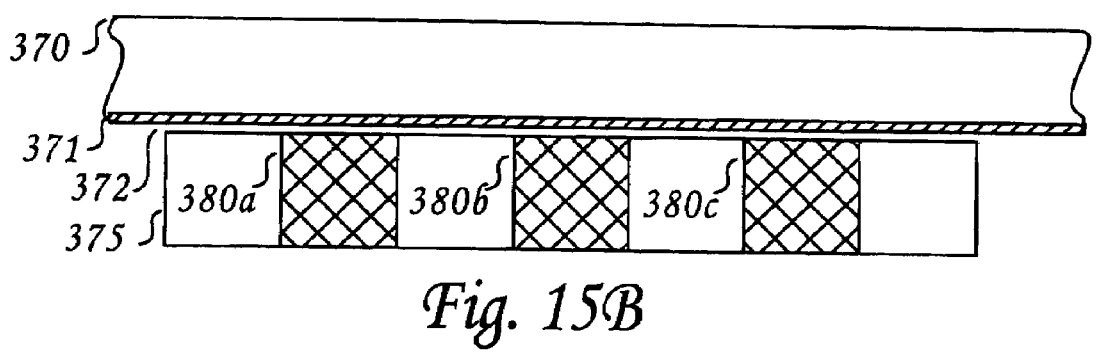
FIG. 15B illustrates a cross-section view along AA of the segment depicted in FIG. 15A.
Figure 15C:
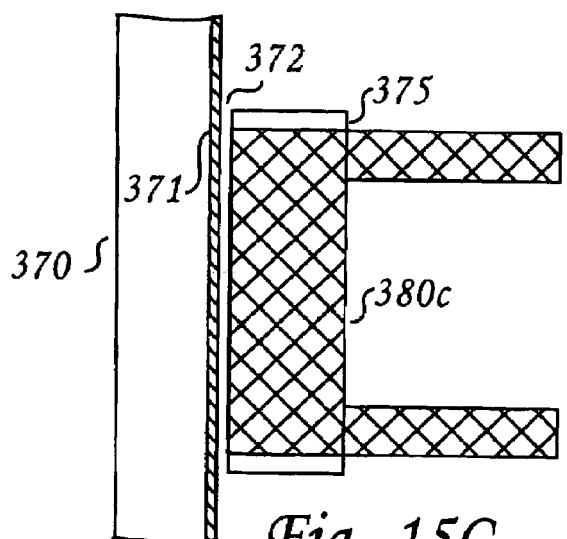
FIG. 15C illustrates a cross-section view along BB of the segment depicted in FIG. 15A.

Attention is now drawn to FIGS. 15A, 15B, and 15C, which illustrate an example of a new generation of magnetic stripe card writer, in accordance with an embodiment of the invention. The magnetic stripe card 370 is placed against the conductor array block 375 (showing conductors: 380*a*, 380*b*, and 380*c* only) where the magnetic stripe 371 faces the array. The card is aligned with the array (using appropriate restraining means), so as to have each track of the magnetic stripe face its corresponding conductor array section. The air gap 372 between the magnetic stripe 371 and the array block 375 is kept to a minimum for best transfer of data. The currents in the conductor array must overcome the coersivity of the magnetic stripe material. The array currents in the conductor array may be applied simultaneously or sequentially (one domain is magnetized at a time) without substantially affecting the data transfer onto the magnetic stripe of the card.

By another embodiment, instead of using an array of conductors in the manner described with reference to FIG. 15, a bi-dimensional or multi-dimensional array of conductors is used, similar as in the various embodiments described with reference to the first aspect of the invention. A non-limiting example being a bi-dimensional matrix, described with reference to FIGS. 4A-B above. The use of matrix of the kind specified simplifies manufacturing and reduces costs, as compared to the use of array of conductors of the kind described with reference to FIG. 15.

As explained above, the invention in accordance with various embodiments thereof obviates the need to carry multiple magnetic cards by storing the content of the multiple cards in a single physical card. It further offers better fraud protection to the consumer. The description below refers mainly to an application of consolidating multiple (magnetic) cards in a single smart card (or programmable device, such as cellular telephone or PDA, referred to also as multi card application). The invention is not bound by this application. For instance, it may be used for other applications, such as those disclosed in the PCT publication.

Thus, the data indicative of the multiple cards can be stored on the smart card, which accommodates also a processor, and in response to user selection, the data of selected card is conveyed by means of the processor through the conductors to the magnetic stripe or emulates the magnetic stripe, all as described in detail above.

By another embodiment of the invention, a portable programmable device stores the information of the multiple cards, and in response to user selection, the data of selected card is conveyed to the magnetic stripe of a conventional magnetic card (or emulates the magnetic stripe), all as described in detail above. The programmable device forms part of external device such as, for instance, a PDA or cellular telephone fitted with or coupled to a writer of the kind described above, e.g. with reference to FIG. 15. The cellular telephone fitted with or coupled to a writer of the dynamic kind of FIG. 4D or a standard magnetic stripe writer is another embodiment possible.

Note that by one embodiment, the user does not have a smart card, but rather a conventional, generic magnetic card, which is updated with appropriate data (e.g. of the selected credit card) from the external programmable device being for example the user's PDA or cellular telephone.

The data indicative of the cards (say the credit cards) can be transferred to the smart card (in the case it holds the data indicative of multiple cards), or to the programmable device (in the case it holds the data indicative of multiple cards) from an external source through either direct or remote coupling, using a safe communication channel.

When the user wants to select a given card to use (from among the plurality of stored credit cards), there is provided in accordance with one embodiment an interactive module that presents to the user a summary of the information stored (such as names of the cards, total spending of each card from a specific date etc.), and allows the user to pick the card, using input means such as keypad. The interactive module can form part of the smart card or the programmable device, depending upon the particular application.

In order to store data of existing cards, their contents is read (using, say conventional magnetic card reader), and the data is stored in the smart card/external programmable device for later use. Optionally, additional information can be added by the user through an optional interactive module. The additional data being, for example, the type of the card (e.g. credit/debit card), credit limits, amount spent from a particular date, the card distributor, and any other information that might be of interest to the user.

By one embodiment, the smart card has an embedded display presenting information relating to the emulated card. The display can optionally present the visible information that exists in the original magnetic card, e.g. the contents of each or selected track. Such information can include the name of the institution that supplies the card, the card number, the name of the holder, expiration date, and a sample signature.

A non-limiting example of a display that can be used is a Ferroelectric LCD that does not require power to maintain the current contents of a display, as it only requires power to change the displayed contents.

By another non-limiting example, the display is powered by the smart card's power. Other variants are applicable.

In accordance with an embodiment of the invention, the user can use the smart card only if he or she enters a PIN through the interactive module. The use of PIN can be required, e.g. before commencing a transaction, or once a day, or once a week at any other time, or not required at all. Certain protection means can be employed, e.g. the insertion of a wrong PIN would delete the content (or portion thereof) of the card. Alternatively, N consecutive failures to insert the correct PIN would delete the content (or portion thereof) of the card. Other variants are, of course, applicable.

By one embodiment of the invention, a provider (say the credit card operator, such as VISA™, MASTERCARD™, etc. transmits information to the programmable device (say a cellular phone), and the latter is capable to receive and store transmitted information. The information is then transferred to the card via the card writer that either forms an integral part of the programmable device, or is coupled thereto.

Non-limiting examples of such transmitted information are:

The information needed to activate a card.
The information needed to configure a new card.
The information needed to complete a transaction.

If desired, the transmission of data can be secured by a PIN, finger print reader, and/or other encryption means. In accordance with this embodiment, the user is exempted from accessing the bank to receive a new card when the previous one has been expired, because the updated data can be transmitted from the credit card operator in the manner described above. Note, generally, that in the context with the various aspects of the invention, encryption means encompass PIN, finger print detection, voice recognition (being example of biometrics identification), and/or other known per se means.

Figure 16:
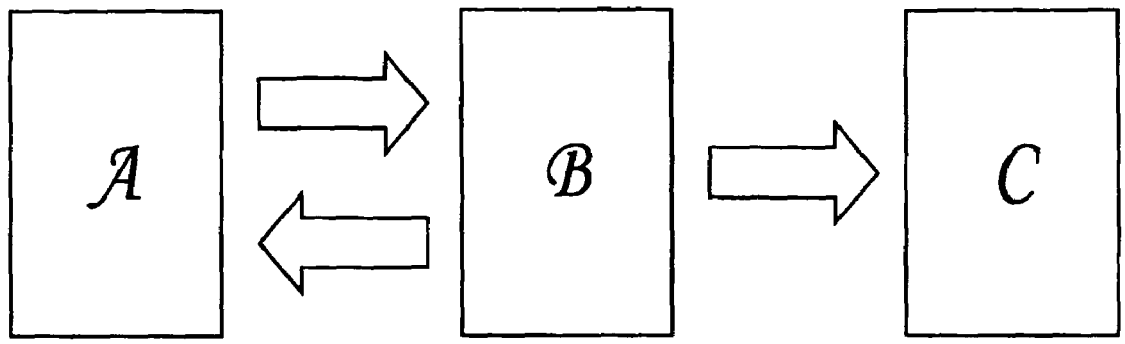
FIG. 16 illustrates a generalized sequence of operation of transferring data, in accordance with an embodiment of the invention.
Figure 16A:
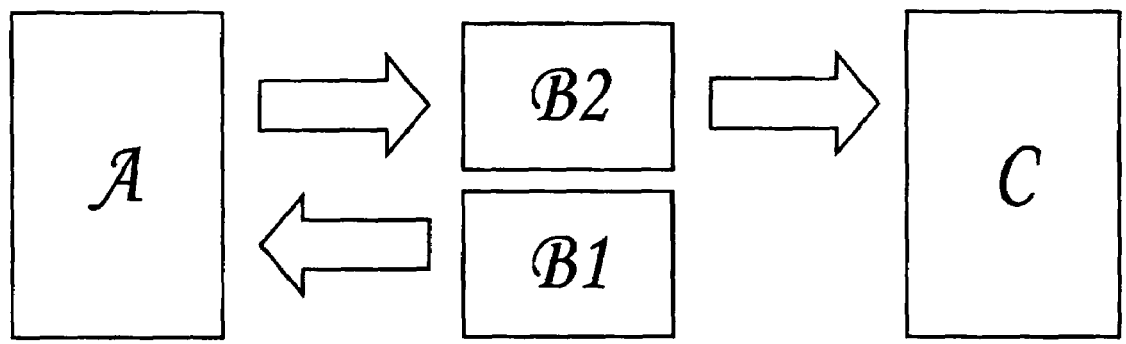

Attention is now drawn to FIG. 16, which illustrates a generalized sequence of operation of transferring data, in accordance with an embodiment of the invention. The invention is, of course, not bound by this specific example.

Thus, module "A" is a programmable module allowing operation with a card reader and/or writer, designated "B", in order to transfer the information to a smart card designated "C".

Module "A" receives card information read from the magnetic stripe of one or multiple cards using module "B" as a card reader (or possibly other dedicated reader). The information is stored in a storage area of module "A". If desired, additional (user defined) information is added to the information stored within module "A" by input means, such as a keypad that is coupled to module "A". By one embodiment, module "A" is an integral module in the smart card "C".

By another embodiment, module "A" forms part of a programmable device, such as cell-phone, capable of receiving keyed-in and/or transmitted information and/or magnetic card information read from a magnetic card reader. This information is stored or added to the storage area of module "A". In operation, the information is transferred to magnetic card "C", via the writer functionality of module "B" (the latter can be separated from A or being integral part thereof). The writing of data to magnetic card C can be, for example, in accordance with the procedure described with reference to FIG. 15.

As described above, the user can interact with module "A" via a keypad and LCD screen. The user is able to view some or all of the stored cards' information, decides which information to send to the magnetic card, and initiates the transfer of the information to the magnetic card.

In the case that modules A and B are fitted in a smart card, the data can be written to the magnetic stripe of the smart card or be sent to emulate the magnetic stripe, all as described in detail above with reference to the various aspects of the invention.

Attention is now directed to FIG. 17, which illustrates a configuration process of the smart card, in accordance with an embodiment of the invention. The invention is of course not bound by this example.

In the FIG. 17, the module designated "A" is a smart card incorporating the following modules:

Module "B" is a LCD device. Module "C" is data storage area. Module "D" is a keypad device. Module "E" is the magnetic stripe of said smart card. Module "F" is a processor running a control program capable of interacting with the keypad "D", data storage "C", LCD "B", the magnetic stripe "E", and module G. Module G is a conductor array and associated electronics, as described above with reference to various aspects of the invention.

By this non-limiting example, information of three cards (numbered 1, 2, and 3) is stored in the storage area "C". The control program "F" is initiated by a user interaction with the keypad "D", to navigate between the information of the different cards. Thus, program "F" switches between the information of the cards 1,2,3 in response to user interaction through keypad "D". Whenever program "F" switches between cards' information, program "F" sends some of the information of the current card to the LCD "B". This information is, e.g., the card name and number (that is presented on the original card). The user is able to select the card of interest, according to the displayed data, by invoking instructions via the keypad "D", and thus program module "F" sends the relevant information of the selected card to module G, which conveys the data to the magnetic stripe "E", all as described in detail above. Once the information is available in the magnetic stripe, smart card "A" is capable to perform as the selected card.

By another non-limiting example, modules "B", "C", "F" and "D" are fitted in a programmable device, such as cell phone or a PDA. Module G is either incorporated in the programmable device, or coupled therewith through interface. Upon user selection of card information, the information of the selected card is transmitted to the magnetic stripe "E" of card "A", via a card writer. By way of another non limiting example, smart card "A" includes also an LCD screen. When the information is sent from the said device to the magnetic stripe of the smart card, additional information (such as the name and number of the selected card) is sent to the LCD. As may be recalled instead, of magnetic stripe (E) the latter can be emulated, using, e.g., the emulation sequence described with reference to FIGS. 8 to 13, above.

The present invention has been described with a certain degree of particularity, with respect to each one of its distinct aspects, but those versed in the art will readily appreciate that various alterations and modifications can be carried out, without departing from the following Claims:

The invention claimed is:

1. A method of statically writing data on standard passive magnetic stripe card by imposing magnetic field of a given polarity on each selected segment of the magnetic stripe, such that data on the magnetic stripe can be read by a standard magnetic card reader and interpreted as digital bits, comprising:
   (i) providing a multi-dimensional conductor array statically placed proximate to the magnetic stripe without relative motion between them;
   (ii) providing current drivers for sending currents in controlled direction through the conductor array;
   (iii) sending currents, using said current drivers, through conductors of the array, such that for each one of the selected array conductors proximate to a magnetic stripe segment, composite currents flow through said conductors, overcoming the coersivity of the corresponding segment of the magnetic stripe.

2. The method according to claim 1, wherein said multi-dimensional conductor array becomes a two-dimensional matrix conductor array.

3. The method according to claim 2, wherein said two-dimensional matrix conductor array includes X conductors in the row dimension of the matrix and Y conductors in the column dimension of the matrix, such that each domain is associated with a unique entry (i,j) identified by a conductor i in the row dimension and conductor j in the column dimension of the matrix;
   and wherein sending currents, using said current drivers, stipulated in (iii) includes sending a current through the i conductor and sending a current through the j conductor where the sum of the i current and the j current overcomes the coersivity of the respective domain.

4. The method according to claims 2 or 3, wherein said X=Y and wherein said I current and j current are of identical magnitude.

5. The method according to anyone of claims 3 and 4, wherein said provision of two dimensional matrix includes provision of a matrix layout such that each of said X and Y conductors have a square waveform like shape and active conductor segments of each i,j, conductors are placed proximate and substantially parallel to their associated domain.

6. The method according to claim 1, wherein said multi-dimensional conductor array becomes a three-dimensional matrix conductor array.

7. A method for statically writing data on a magnetic stripe track of a standard passive magnetic card, comprising:
   (i) providing a conductor array proximate to the magnetic stripe statically without relative movement between them;
   (ii) providing current drivers for sending currents in a controlled direction through the conductor array; and
   (iii) sending currents using said current drivers through conductors of the array, for generating magnetic field of sufficient magnitude so as to overcome the coersivity of the magnetic stripe.

8. The method according to claim 7, wherein said conductor array includes at least one conductor for each magnetic domain in the magnetic stripe.

9. The method according to claim 7, wherein said conductor array is a multi-dimensional conductor array.

10. The method according to claim 9, wherein said multi-dimensional conductor array, is a two-dimensional matrix.

11. The method according to claim 9, wherein said multi-dimensional conductor array, is a three-dimensional matrix.

12. A system for statically writing data on a standard passive magnetic stripe of a card, comprising:
   a conductor array capable of being placed proximate to the magnetic stripe statically and without relative motion between them;
   current drivers configured to send currents in a controlled direction through the conductor array;
   a device configured to sending currents, using said current drivers, through conductors of the array, for generating magnetic field of sufficient magnitude so as to overcome the coersivity of the magnetic stripe.

13. The system according to claim 12, wherein said system includes a programmable device and associated input means and storage for storing information indicative of plurality of cards and, in response to user selection, data is converted to currents sent in controlled direction through the conductor array.

14. The system according to claim 13, wherein said programmable device, associated input means and storage, conductor array, and current drivers are all integral in the system.

15. The system according to claim 13, wherein said programmable device, associated input means and storage or parts thereof, are accommodated in external device that is coupled to said conductor array and current drivers.

16. The system according to claim 15, wherein said external device is a PDA or cellular telephone.

17. The system according to claim 14, wherein said system is included in PDA or cellular telephone.

18. The system according to claim 13, wherein said data is at least one member selected from the group that includes: data indicative of a selected card, data required to activate a card, data required to configure a new card, data required to complete transaction.

* * * * *